(12) United States Patent
Pant et al.

(10) Patent No.: US 10,087,537 B2
(45) Date of Patent: Oct. 2, 2018

(54) CURRENT DENSITY DISTRIBUTOR FOR USE IN AN ELECTRODE

(71) Applicant: VITO NV, Mol (BE)

(72) Inventors: Deepak Pant, Mol (BE); Xochitl Dominguez Benetton, Mol (BE); Yolanda Alvarez Gallego, Mol (BE); Bert Bouwman, Mol (BE)

(73) Assignee: VITO NV, Mol (BE)

( * ) Notice: Subject to any disclaimer, the term of this patent is extended or adjusted under 35 U.S.C. 154(b) by 212 days.

(21) Appl. No.: 14/770,431

(22) PCT Filed: Feb. 26, 2014

(86) PCT No.: PCT/EP2014/053737
§ 371 (c)(1),
(2) Date: Aug. 25, 2015

(87) PCT Pub. No.: WO2014/131799
PCT Pub. Date: Sep. 4, 2014

(65) Prior Publication Data
US 2016/0010227 A1    Jan. 14, 2016

(30) Foreign Application Priority Data
Feb. 26, 2013   (EP) .................................. 13156781

(51) Int. Cl.
*H01M 4/74*    (2006.01)
*H01M 4/86*    (2006.01)
(Continued)

(52) U.S. Cl.
CPC .......... *C25B 11/035* (2013.01); *H01G 9/035* (2013.01); *H01G 9/042* (2013.01); *H01M 4/742* (2013.01);
(Continued)

(58) Field of Classification Search
CPC .. H01M 4/742; H01M 4/8605; H01M 4/8807; H01M 4/8828; H01M 4/8896;
(Continued)

(56) References Cited

U.S. PATENT DOCUMENTS 3,594,236 A    7/1971  Boden et al.
4,354,917 A    10/1982 Solomon
(Continued)

FOREIGN PATENT DOCUMENTS

EP          1 986 256 A1    10/2008
JP          2006107926 A  *  4/2006
WO       WO 2012076774 A1 *  6/2012   .......... H01M 4/8605

OTHER PUBLICATIONS

Kato, Manabu, Machine Translation of JP 2006-107926 A, Apr. 2006.*

(Continued)

*Primary Examiner* — Sean P Cullen
(74) *Attorney, Agent, or Firm* — Knobbe, Martens, Olson & Bear, LLP

(57) ABSTRACT

The present invention relates to a mesh-shaped, porous electric current density distributor for use with an electrode, the current density distributor being adapted for providing electric current to an active layer of the electrode, which active layer is provided to contact a face of the current density distributor, wherein the current density distributor comprises a porous mesh having a plurality of electrically conductive paths, wherein at least part of the electrically conductive paths extend along a direction of major current flow over the current density distributor. The porous mesh comprises in a direction crosswise to the direction of major electric current flow, a plurality of first paths of an electric insulator. The current carrying capacity of the current density distributor in crosswise direction to the major current flow over the current density distributor is smaller than the (Continued)

current carrying capacity in the direction along the major current flow over the current density distributor.

28 Claims, 36 Drawing Sheets

(51) Int. Cl.
*H01M 4/88* (2006.01)
*H01M 8/02* (2016.01)
*C25B 11/03* (2006.01)
*H01G 9/042* (2006.01)
*H01M 8/1004* (2016.01)
*H01M 8/16* (2006.01)
*H01M 8/0239* (2016.01)
*H01M 8/0243* (2016.01)
*H01G 9/035* (2006.01)
*H01M 8/08* (2016.01)
*H01M 8/0247* (2016.01)

(52) U.S. Cl.
CPC ....... *H01M 4/8605* (2013.01); *H01M 4/8807* (2013.01); *H01M 4/8828* (2013.01); *H01M 4/8896* (2013.01); *H01M 8/0239* (2013.01); *H01M 8/0243* (2013.01); *H01M 8/1004* (2013.01); *H01M 8/16* (2013.01); *H01M 4/8673* (2013.01); *H01M 8/0247* (2013.01); *H01M 8/08* (2013.01); *Y02E 60/527* (2013.01); *Y02P 70/56* (2015.11)

(58) Field of Classification Search
CPC .... H01M 8/16; H01M 8/0238; H01M 8/0243; H01M 8/1004; H01G 9/035; H01G 9/042; C25B 11/035
USPC .......................... 429/241; 204/284; 361/503
See application file for complete search history.

(56) References Cited

U.S. PATENT DOCUMENTS

| 4,602,426 | A | 7/1986 | Kampe et al. | |
|---|---|---|---|---|
| 5,670,278 | A | 9/1997 | Disselbeck | |
| 2003/0054254 | A1* | 3/2003 | Kubo | H01M 4/661 429/233 |
| 2004/0241078 | A1* | 12/2004 | Inoue | D03D 15/00 423/447.1 |
| 2005/0058869 | A1* | 3/2005 | Mathias | H01M 4/8807 429/480 |
| 2009/0081526 | A1* | 3/2009 | Hwang | H01M 4/8605 429/450 |
| 2009/0269671 | A1* | 10/2009 | Kim | H01M 8/0213 429/247 |
| 2010/0129696 | A1* | 5/2010 | Hong | H01M 4/8807 429/439 |
| 2011/0027664 | A1 | 2/2011 | Burchardt et al. | |
| 2013/0309593 | A1* | 11/2013 | Rouillon | H01M 4/8605 429/480 |

OTHER PUBLICATIONS

Margit Lenninger et al. "High Current Density 3D Electrodes Manufactured by Technical Embroidery." J. Solid State Electrochem. vol. 17. May 9, 2013. pp. 2303-2309.

Andrew J. Stapleton et al. "Highly Conductive Interwoven Carbon Nanotube and Silver Nanowire Transparent Electrodes." Sci. Technol. Adv. Mater. vol. 14. 035004. May 7, 2013. pp. 1-8.

International Search Report dated May 26, 2014, received in corresponding International Patent Application No. PCT/EP2014/053737.

International Preliminary Report on Patentability dated Jul. 21, 2015, received in corresponding International Patent Application No. PCT/EP2014/053737.

European Search Report dated Jul. 29, 2013, received in corresponding European Application No. 13156781.0.

\* cited by examiner

CURRENT DENSITY DISTRIBUTOR FOR USE IN AN ELECTRODE

FIELD

The present invention relates to a mesh-shaped, porous electric current density distributor for use with an electrode, the current density distributor being adapted for providing electric current to an active layer of the electrode, which active layer is provided to contact a face of the current density distributor, wherein the current density distributor comprises a porous mesh having a plurality of electrically conductive paths, wherein at least part of the electrically conductive paths extend along a direction of major current flow over the current density distributor, according to the preamble of the first claim.

BACKGROUND

Electrochemical reactors are known as such, they usually comprise one or more electrically connected electrochemical single cells, arranged in a bipolar arrangement or a unipolar arrangement, the latter is also called mono-polar arrangement.

A bipolar arrangement finds frequent use in solid polymer electrolyte technologies, for example PEMFC and PEM electrolysers. In an electrochemical cell stack with bipolar arrangement, the so-called bipolar plate is a conductive element placed between two cells. It connects electrically adjacent cells in series ("Encyclopedia of Electrochemical Power Sources", ISBN: 978-0-444-52745-5) Electrons generated or consumed within the active layer of the electrode flow in a direction perpendicular to the plane of the electrode (y-axis), and pass through the bipolar plate, situated between the anode of one cell and the cathode of the adjacent cell, they do not have to flow in the plane of the electrode to the collection point(s) at the edge of the electrode (lug).

In unipolar arrangement, the electrochemical cells forming the stack/electrochemical reactor are externally connected. In an electrochemical reactor/stack of galvanic cells with unipolar arrangement the anode of a cell is electrically connected to the cathode of an adjacent cell using an external electrically conductive element, e.g. a cable, metal wire, etc., which is attached to a current feeder bar mounted along an edge of the electrode, or along part of that edge. The electrons are collected by the current feeder at the edge of the anode, an external cable connects the anode to the cathode of the adjacent cell ("Fuel cells: fundamentals and applications", ISBN 978-0-387-35402-6).

In an electrolyser with a unipolar arrangement, a plurality of alternating positive and negative electrodes forming a stack are separated by ion permeable membranes. In an electrolyser with unipolar design, electrochemical cells forming the stack are externally connected, the positive electrodes are electrically connected in parallel as well as the negative electrodes. The assembly is immersed in an electrolyte bath or tank. A cell stack with unipolar arrangement requires collection of the electrons at the anode and an external connection to the cathode of the next cell. Unipolar arrangements of electrochemical cells find widespread use in low power applications and special applications where replacement of a malfunctioning single cell may be required during operation. Unipolar arrangement namely permits simple and easy identification and replacement of malfunctioning cells, which is not the case in a bipolar stack ("Fuel Cell Science and Engineering: Materials, Processes, Systems and Technology", ISBN: 9783527650248). Unipolar arrangement is also preferred in the case of electrochemical cells with liquid electrolyte in which direct contact between anode and cathode is prevented by the presence of an inert spacer material. However, care needs to be taken to select an appropriate spacer material, as it may unnecessarily increase the weight and the dimensions of the cell.

Major limitations of unipolar arrangements are their relatively high cost and the fact that the power density distribution over the current density distributor may be irregular, as a result of which the power density may be locally insufficient. In a unipolar arrangement the electron current is transported over the length of the electrode between opposite sides of the electrode over the plane of the electrode, which connect a current feed and a current collector of the electrode. It has been observed that not all of the current seems able to flow over the entire electrode surface and reach the edge along which the current is collected. As a result, local ohmic over-potential can be relatively high, which hampers the efficiency of the electrolytic cell.

The problem that conventional porous electrodes and gas diffusion electrodes do not show a sufficient internal conductivity to permit collecting a major part of the electrons at the current collector at the edge of the electrode, has been solved by the incorporation of a current density distributor which is conductive to a major part of the electrode structure. Frequently used current density distributors comprise a metal mesh, which is incorporated into the active, porous layer of the electrode, where the electrochemical reaction is carried out. The mesh adds the required in-plane conductivity to the electrode in the direction along the direction of major current flow and in cross direction thereof and provides mechanical and dimensional support to the electrochemically active layer of the electrode. Metal grids or meshes with a low electrical resistance made of a variety of alloys in a wide combination of thicknesses and open areas, are commercially available.

However, the existing metal mesh current density distributors, in particular when used in unipolar electrodes, present several disadvantages. The metal wires are quite expensive and thereby significantly contribute to the cost of the electrode. Besides this, the metal wires have a high density, as a result of which the weight of the electrode may raise quite high if a certain current carrying capacity is envisaged (see "Fuel cells: fundamentals and applications, ISBN 978-0-387-35402-6, "Encyclopedia of Electrochemical Power Sources", ISBN: 978-0-444-52745-5, "Fuel Cell Science and Engineering: Materials, Processes, Systems and Technology", ISBN: 9783527650248.)

EP0.051.437 discloses an electrolytic cell which is used for the production of chlorine gas and sodium hydroxide from a saturated sodium chloride salt solution. Although the use of oxygen (air) cathodes permits suppressing undesired formation of molecular hydrogen at the cathode, molecular hydrogen formation still accounts for approximately 25% of the electrical energy consumption used to operate the cell.

The oxygen cathode disclosed in EP0.051.437 comprises an active layer of silver catalyzed active carbon particles positioned within an unsintered network of fibrillated carbon black-polytetrafluoroethylene. The "working" face of the active layer is covered with an asymmetric woven wire mesh current density distributor, the other opposite face of the active layer is covered with a layer of a porous, wet-proofing backing material for example made of PTFE. The asymmetric woven wire mesh current density distributor has been designed in such a way that it has more conductive wires in the direction generally perpendicular to the major current feed to the current density distributor than in the direction generally parallel to the direction of major current feed. The generally perpendicular wires span the narrow (shorter) conductive path of the electrode. The asymmetric woven wire mesh current density distributor preferably has from 1.5 to 3 times as many such perpendicular wires as parallel wires, in particular 50 strands/inch of perpendicular wires and 25 strands/inch of parallel wires versus conventional symmetrical woven wire mesh having a wire thickness of 0.005 inch (0.127 mm). It is explained that due to the asymmetric structure of the wire mesh current density distributor, substantial economies in material and weaving costs can be achieved, while an efficient current distribution and control of the direction of current travel with its resulting control of current path, can be achieved.

The current density distributor disclosed in EP0.051.437 however presents the disadvantage that only a limited portion of the wires in perpendicular direction may be removed, if mechanical and dimensional stability are to be guaranteed as well as a sufficient support to the active layer. Thus according to EP0.051.437 a limited weight and cost reduction may be achieved only.

SUMMARY

There is therefore a need to a current density distributor for use in an electrode, which has a lower weight than the known current density distributor and may be manufactured at reduced production cost, without thereby adversely affecting the dimensional and mechanical stability of the current density distributor.

The present invention therefore seeks to provide such a current density distributor, which has a lower weight than the known current density distributor and may be manufactured at reduced production cost, and which shows a good dimensional and mechanical stability.

This is achieved according to the present invention with an electrode showing the technical features of the characterizing portion of the first claim.

Thereto, the current density distributor of the present invention is characterized in that the porous mesh comprises in a direction crosswise to the direction of major electric current flow, a plurality of first paths of an electric insulator, and in that the current carrying capacity of the current density distributor in crosswise direction to the major current flow over the current density distributor is smaller than the current carrying capacity in the direction along the major current flow over the current density distributor.

It is remarked that the term "current density distributor" as used in the present application, means an electrically conducting material in the form of a porous mesh, capable of distributing electric current over an electrode and of exchanging electrons with the active layer of the electrode.

The inventors have observed that the electrically conductive paths which extend crosswise to the major direction of the electric current flow over the current density distributor, hardly contribute to the conduction of the electric current (and the electron transport) over the current density distributor. The inventors have also observed that removing the crosswise extending electrically conductive paths as a means to reduce the current carrying capacity in that direction, hardly has any influence on the distribution of the electric current over the current density distributor, if any. As a consequence, the contribution by the crosswise extending electrically conductive paths to the electron supply towards and to the performance of an active layer contacting the electric current density distributor, will most probably be negligible as well. Thus, the amount of electrical conductive material used in a direction crosswise to the direction of the major electric current flow may be reduced, at minimum risk to adversely affecting the electric current distribution over the current density distributor. In practice, a lower current carrying capacity in crosswise direction to the direction of major current flow may typically be obtained by having a smaller number of electric conductive paths per length unit in cross direction of the major electric current flow or by using electric conductors with a smaller average diameter or cross section in that same direction. Both measures will have the effect that both the material weight in cross direction of the major electric current flow and therewith the material cost of the current density distributor may be reduced.

The supplemental incorporation of an appropriate number of paths of electrically insulating material in the direction crosswise to the direction of major current flow, ensures that the mechanical and dimensional stability of the mesh shaped current density distributor may be maintained within the desired ranges or may even be improved, without compromising the weight or cost of the current density distributor. A simple reduction of the number or size of the electrically conductive paths in the cross direction may namely risk to deteriorate the mechanical and dimensional stability. The inventors have observed that the incorporation of paths of an electric insulator does not necessarily complicate the production process for manufacturing the current density distributor, nor do they interfere with the flow and distribution of the current over the current density distributor in a disadvantageous manner. The preferred electrical insulating materials used in this invention are the materials having a relatively lower specific weight ($g/cm^3$) than the electrical conductive materials.

The inventors have further observed that the reduction of electrically conductive paths in a crosswise direction to the major current flow direction permits increasing the current carrying capacity in the direction along the direction of major current flow, since additional electric conductor paths may be mounted in the latter direction without necessarily increasing the weight and material cost of the current density distributor above undesirable limits, and without further complicating the production process. On the contrary, the advantage associated with the increased current carrying capacity in the direction along the major current flow is that a higher flow capacity may be achieved in that direction, leading to a more homogeneous current density distribution over the entire current density distributor. Also, a smaller distance between adjacent electric conductors in the porous mesh has the effect that a more homogeneous current density distribution may be achieved, so that a larger number of active sites present in an active layer associated with the current density distributor may be fed with electrical energy. This is advantageous when using the current density distributor in an electrochemical cell, since a more homogeneous performance of an active layer contacting the current density distributor may be achieved, which generally will result in an improved reaction kinetics, reaction selectivity, reaction yield, electrochemical extraction and ion migration rate. Thus, by reducing the electric current carrying capacity in cross direction of the major electric current flow, the electric carrying capacity along the major electric current flow may be increased. Any mechanical or dimensional instability that would result therefrom may be compensated by incorporating paths of electric insulating material in cross direction of the major current flow.

The present invention thus discloses a current density distributor which may provide an optimum compromise between showing a reduced weight per unit area and a reduced material cost, without adversely affecting the mechanical and dimensional stability. Moreover, the electric current carrying capacity in a direction which extends along the direction of the major electric current flow may be improved, and as a result a more homogeneous current density distribution over the current density distributor may be obtained. With a more homogeneous distribution is meant that a more homogeneous current density over the whole surface of the current density distributor may be obtained, but also that the number of locations with low or no current may be reduced. This has advantageous in applications which make use of the current density distributor of this invention.

An increased current carrying capacity in the current density distributor may for example be achieved by using a larger number of electrically conductive paths, or by increasing the average diameter of the electrically conductive paths.

In order to permit maximizing the weight reduction of the current density distributor, at minimum risk of adversely affecting its mechanical and dimensional, it is preferred to have a smaller number of electrically conductive paths per length unit in the direction crosswise to the direction of the major current flow. By reducing the number of electrically conductive paths per length unit in cross direction when compared to the direction extending along the direction of major electric current flow, the weight of the current density distributor may be reduced as well as material costs, without adversely affecting the current flow and current density distribution over the current density distributor.

Alternatively or in addition to having a smaller number of electrically conductive paths per length unit in cross direction than along the direction of the major current flow, at least part of the electric conductive paths along the direction parallel to the current flow may have a larger average cross section than the electrical conductive paths in cross direction to the direction of the major current flow. The use of electrical conductive paths with a larger average cross section will permit to reduce the electrical resistance of the electrical conductive paths and increase their current carrying capacity, so that the electric current flow towards parts remote of the current feed may be ensured and a more uniform current density distribution over the current density distributor may be achieved. At the same time the fraction of open area may be increased, which has the effect that a larger surface area of the active layer contacting the current density distributor, is accessible to the reactants and available for electrochemical reaction, separation, conversion and/or extraction. Preferably however, the average cross section of the electrical conductive paths is such that the dimensions of the current density distributor in thickness direction does not raise too high as this would increase the dimensions, in particular the thickness, of an electrode containing the current density distributor in contact with an active layer. In some embodiments, the electrode further comprises an active layer having a plurality of contact points with the current density distributor.

If a further weight reduction is envisaged, the porous mesh may comprise in a direction along the direction of major current flow over the current density distributor, a plurality of paths of an electric insulator. The presence of the electric insulating paths ensure that the mechanical and dimensional stability of the mesh are not negatively influenced, without compromising the weight and cost of the current density distributor.

The homogeneity of the current density distribution over the current density distributor may further be improved by arranging the electric conductive and the electric insulating paths according to a regular pattern. This may for example be achieved by having in a direction along the direction of major current flow alternating electrically conductive paths and electrically insulating paths. This may for example also be achieved by arranging the electrically conductive paths and the paths of electrical insulator according to a regular geometric pattern. A homogeneous current density distribution may be important to achieve a homogeneous performance of the active layer, improved reaction kinetics, reaction selectivity, reaction yield, electrochemical extraction and ion migration rate and ensure homogeneous reaction yield per surface area unit of the electrode. A more homogeneous performance of the active layer may also result in a better over-all yield of the electrolytic cell, since it may reduce the risk to steric inhibition of adjacent electrochemically active sites.

In order to achieve optimum functionality of the current density distributor, in particular to ensure an optimum contact between the current density distributor and an active layer contacting the current density distributor, while providing a sufficient dimensional and mechanical strength, the arrangement of the electric conductive paths in the current density distributor and the electric insulators, may be optimized using current and potential distribution modeling.

The present invention also relates to an electrode comprising a current density distributor as described above or a plurality of such current density distributors, wherein the electrode may either be an anode or a cathode or a capacitive electrode. The invention also relates to a gas diffusion electrode comprising the above described current density distributor, wherein the gas diffusion electrode further comprises a porous active layer which contacts a first face of the current density distributor, and preferably a layer of a hydrophobic material arranged along the opposite face of the current density distributor. In a preferred embodiment the electrode additionally functions as a barrier between a liquid phase on one side of the electrode and a gas phase on the opposite side of the electrode, owing to the bubble point pressure of one or more of the electrode layers. In another preferred embodiment, the electrode is completely or partially submerged in the liquid electrolyte.

Such electrodes are particularly suitable for use in electrochemical cells where anode and cathode are separated by a free electrolyte liquid phase. The present invention therefore also relates to an electrochemical cell containing one or more of the electrodes as described above.

The current density distributor of the present invention may for example also be used as a component of a multi-layered electrode, either the anode or cathode, the electrochemically active layer of which comprises polymer bonded electrochemically active particles.

The present invention further relates to an electrochemical cell comprising at least one electrode comprising a current density distributor. The present invention relates particularly to an electrochemical cell comprising a plurality of such electrodes, in a unipolar arrangement.

The term "electrochemical cell" refers to a device consisting of at least one positive electrode and at least one negative electrode between which a voltage difference (also known as electromotive force) is established due to both the presence of an ion conductive path (electrolyte) connecting them ionically and the presence of an electric load (able to either consume or impress a flow of electrons) connecting them electrically.

It is remarked that the term "electrochemical cell" within the scope of this invention may refer to a device for converting chemical energy into electrical energy, for example a galvanic cell. A galvanic cell usually comprises two or more electrodes (at least one anode, at least one cathode) which are arranged in such a way that an overall oxidation-reduction reaction produces an electromotive force. The term "fuel cell", as used in disclosing the present invention, means a galvanic cell in which the reaction between a fuel with an oxidant converts the chemical energy of the fuel directly into electrical energy without combustion.

Within the scope of this invention the term "electrochemical cell" may also refer to a device for converting electrical energy into chemical energy through electrolysis, i.e. an electrolytic cell. An electrolytic cell usually comprises two electrodes which are arranged in such a way that an overall oxidation-reduction reaction produces an electromotive force. The term "electrochemical cell" as used in disclosing the present invention may also refer to a device for use in electrochemical non faradaic processes or electrostatic separation or extraction processes, for example capacitive deionization".

Application areas of electrochemical cells equipped with one or more electrodes comprising a current density distributors of the present invention described above include electrochemical cells for use in electrochemical conversion systems, for example fuel cells in which the reaction between a fuel and an oxidant converts the chemical energy of the fuel directly into electrical energy; electrolysis; in electrosynthesis reactions for example for the production of hydrogen, hydrogen peroxide, the co-generation of chemicals and electricity; electrowinning; metal-air batteries; in bioelectro-chemical systems, such as microbial fuel cells, microbial electrolysis cells, bio-electrosynthesis reactions; in electrochemical separation processes for example capacitive deionization, which is suitable for de-ionizing water by applying an electrical potential difference over two porous carbon electrodes. The anions are removed from the water and are stored in the positively polarized electrode. Likewise the cations are stored in the negatively polarized electrode.

The invention is further elucidated in the appending figures and figure description which show preferred embodiments of the invention.

In the drawings, the size of some of the elements may be exaggerated and not drawn on scale for illustrative purposes. The dimensions and relative dimensions do not necessarily correspond to actual reductions to practice of the invention.

In the description below the term "contact" also used in the claims, should not be interpreted as being restricted to direct connections only. It means that there exists a path between an output and an input which may be a path including other devices or means. "Contact" may mean that two or more elements are either in direct physical or electrical contact, or that two or more elements are not in direct contact with each other but yet still co-operate or interact with each other.

DETAILED DESCRIPTION

Figure 1A:
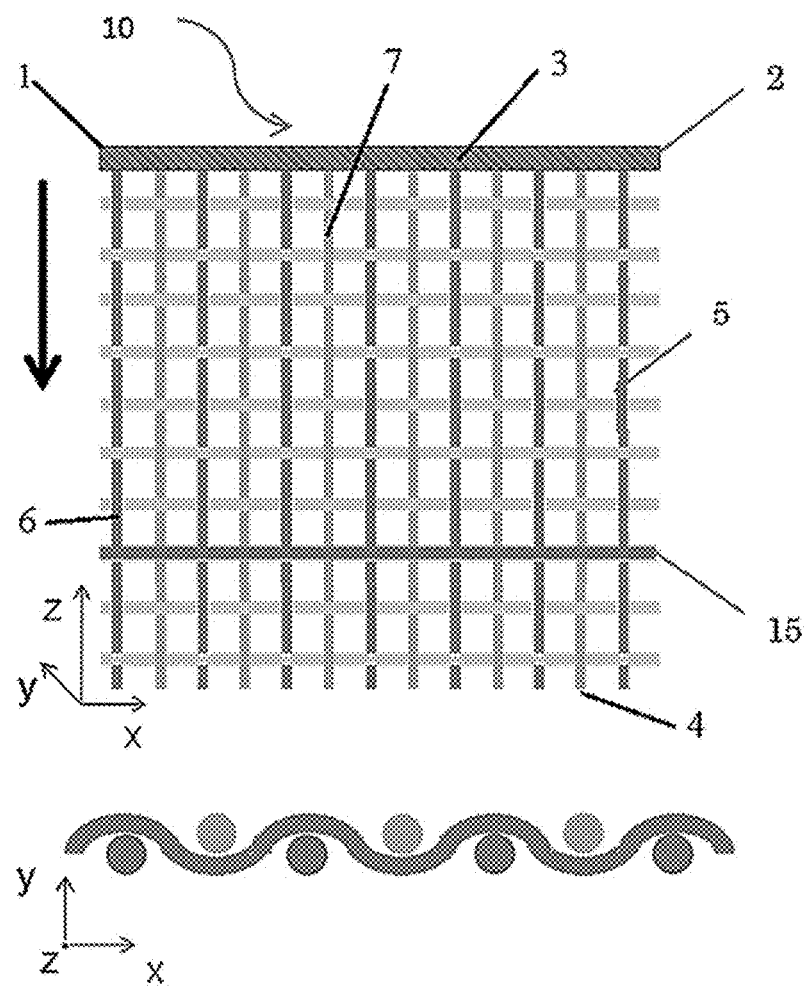
FIGS. 1A and 1B show a schematic example of a current density distributor respectively comprising a plain woven material and a leno woven material.

In the drawings and examples it is assumed that the direction of the major electric current flow is the z-axis, the direction crosswise to the major current flow is the x-axis. The smallest dimension or thickness of the current density distributor and of an electrode containing the current density distributor is the direction of y-axis. Dimensions in the figures are indicative and not in scale.

The current density distributor shown in FIGS. 1A-1D comprises a circumferential electrically conductive frame 1 housing one single porous mesh 10, or an array of several porous meshes 10. Instead of a circumferential housing, other configurations may be used, such as for example shown in FIGS. 3A and 3B, where electric current is fed along a lug which extends only along part of a first side 2 of the current density distributor. It is understood that the dimensions of the lug, i.e. its height and length along the first side 2 may vary depending on the envisaged use of the current density distributor.

A first side 2 of the frame is connected to a source of electric energy using a current feeder 3, for supplying electrical energy to the current density distributor. The electric current is supposed to flow from the feeder 3 to the side 4 opposite the first side 2, in a direction indicated by the arrow, where current may be collected. The frame 1 may however be limited to a current feeder 3 and a current collector, mounted to opposite sides of the current density distributor.

Figure 2A:
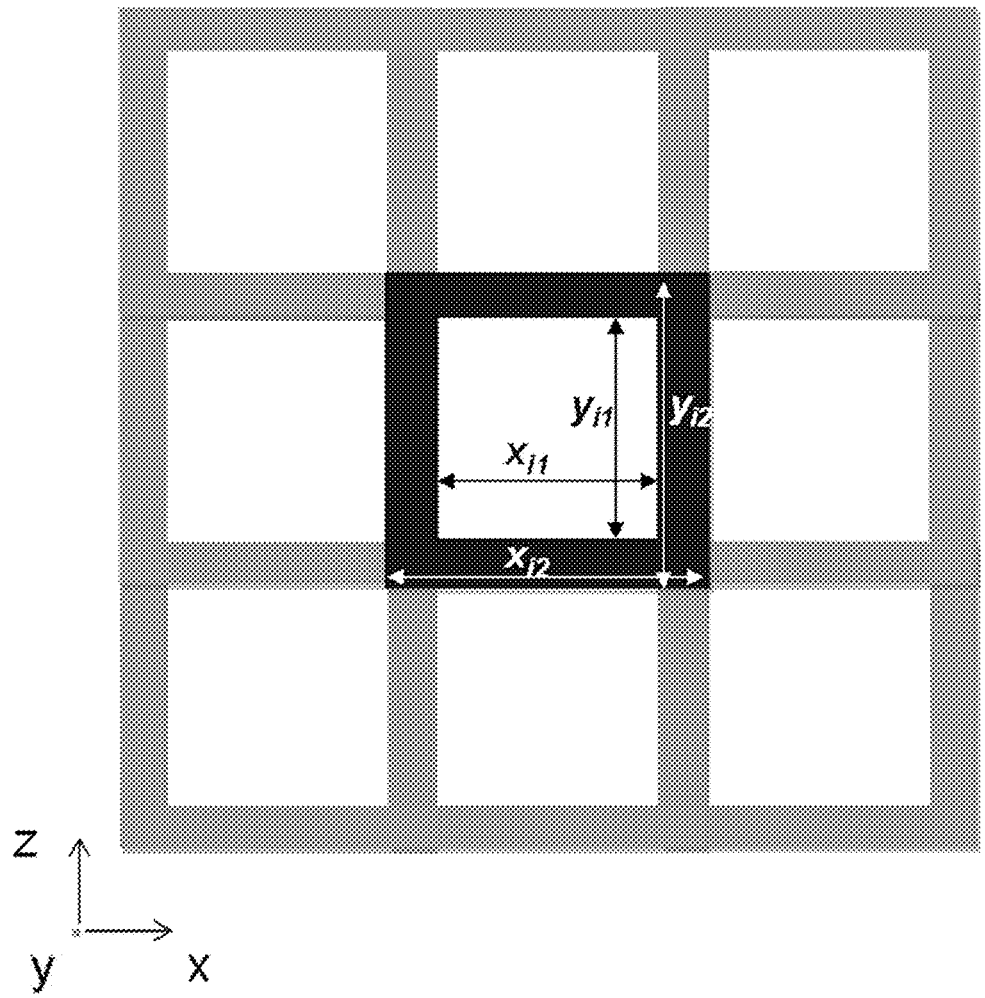
FIG. 2A shows what is meant with "open area" in a mesh.
Figure 2B:
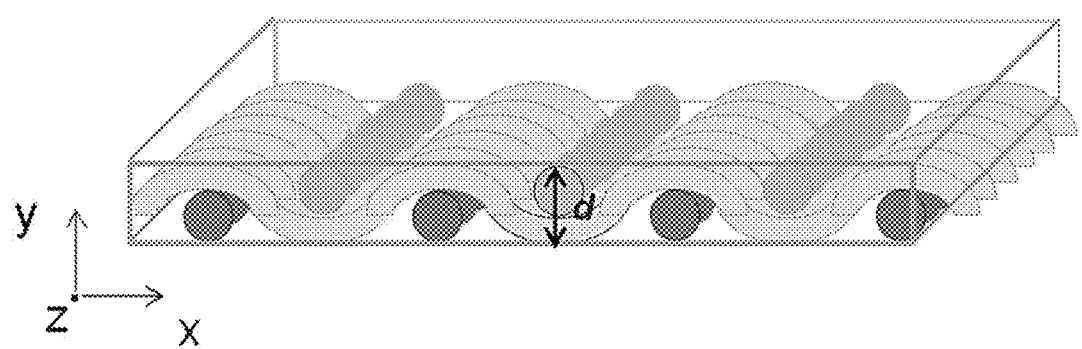
FIG. 2B shows a view to an example of a current distributor of the present invention, showing the y or thickness direction.

The mesh 10 comprises a plurality of electrically conductive paths 5, 15, 25 which may be connected to each other or contact each other or not depending on the nature of the porous mesh. At least part of the electrically conductive paths 5 extend along the direction of major current flow over the current density distributor. The mesh 10 may comprise a plurality of electrically conductive paths 15 which extend in cross direction to a direction of major current flow over the current density distributor. The mesh 10 may further comprise in cross direction to the direction of major electric current flow, a plurality of paths 6 of an electric insulator. The mesh 10 may also comprise in a direction along the direction of major electric current flow, a plurality of paths 7 of an electric insulator. The mesh may extend mainly in x and z direction, but it may extend in y direction also as is shown by FIG. 2B. The mesh may be a square mesh, but other geometries may be used as well. The geometry of the mesh will in general vary with the nature of the material as described below.

Figure 17:
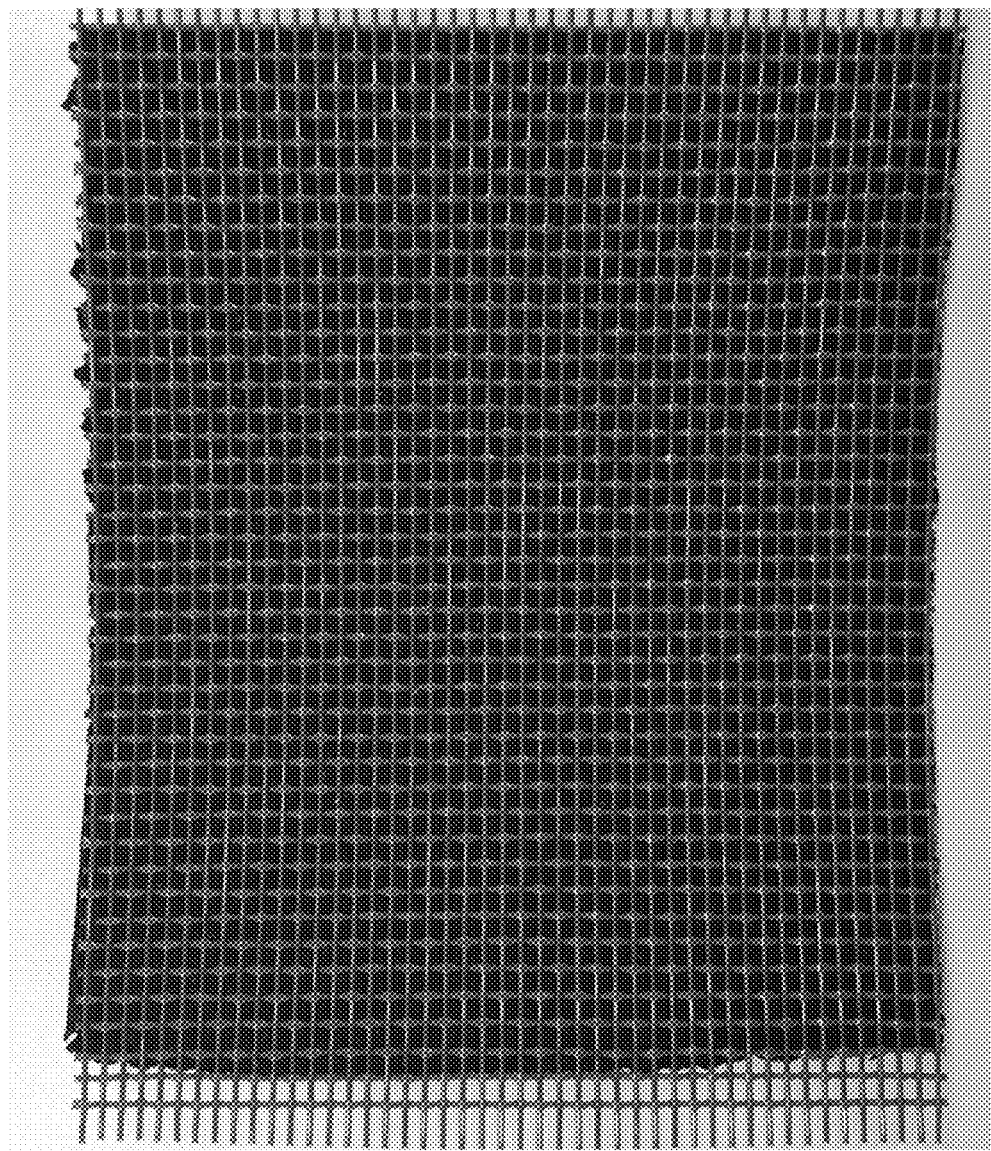
FIG. 17 represents the current density distributor comprising a mixed metal and plastic mesh.
Figure 18:
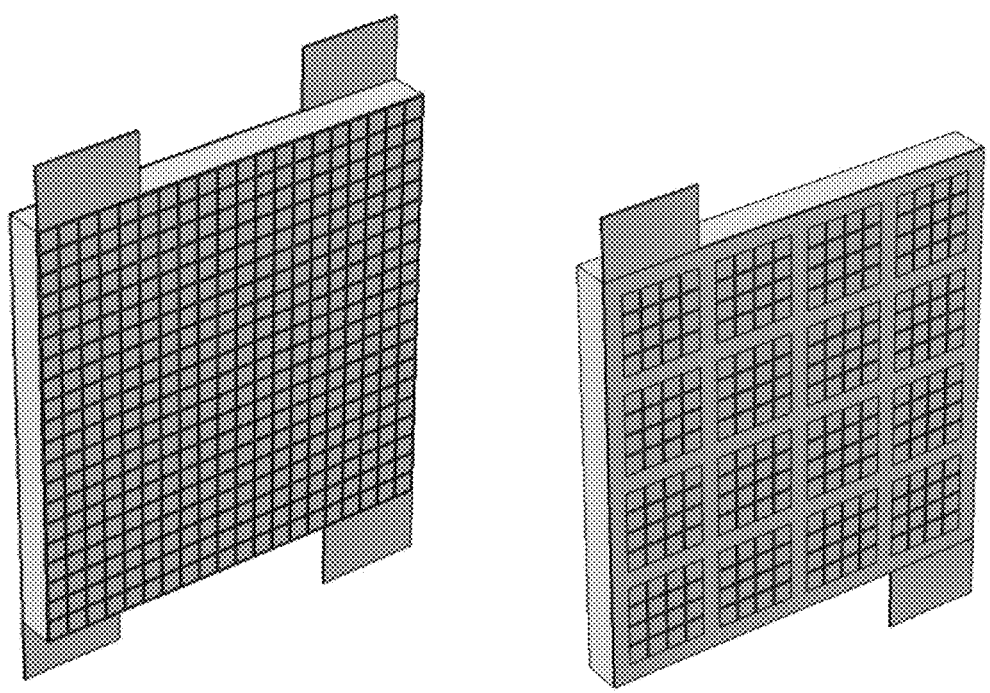
FIG. 18 shows a view to an electrode comprising the current density distributor of this invention, wherein the current density distributor comprises a lug along the top for feeding electric current.

Within the scope of the present invention with "mesh" is meant a woven, knitted, braided, welded, y expanded mesh of fibers, bars or threads. The wording "mesh" is meant to include a square meshes with a substantially rectangular shape and orientation of the conductive wires and insulating threads such as the one shown in FIG. 17, but the mesh may also be tubular, or a coil film, or a otherwise shaped three-dimensional materials. In a plate, sheet, foil, film or screen holes may for example be created using photochemical etching or electroforming. Where use is made of a perforated plate, sheet, foil, film, screen or woven material, the paths which extend along the direction of major current flow will generally run substantially parallel to the direction of major current flow, and the paths which extend in cross direction to the direction of major current flow will generally extend substantially perpendicular to the major direction of current flow. Also, the paths which extend along the direction of major current flow will generally run substantially perpendicular to the paths which extend in cross direction of the major current flow. Where use is made of a knitted, braided or expanded mesh, the holes may have a somewhat irregular shape and may be irregularly positioned and holes of two or more different shapes may be present. Also, the paths which extend along the direction of major current flow will generally extend under an angle >90° to the direction of major current flow, and the paths which extend in cross direction to the direction of major current flow will generally extend under an angle <90° to the major direction of current flow. Also, the paths which extend along the direction of major current flow may, but will often not run substantially perpendicular to the paths which extend in cross direction of the major current flow. Where use is made of a woven material, a screen or a plate with an open structure, the holes will often be arranged according to a geometric pattern. The holes may be evenly spaced apart in x direction of the mesh, but an irregular spacing is possible as well. According to another preferred embodiment the holes may be evenly spaced apart in z direction of the mesh, but an irregular spacing is possible as well. The porous mesh may be an isotropic material or an anisotropic material.

The woven material may for example be a plain weave (also called tabby weave, linen weave or taffeta weave), leno weave (also called cross weave or gauze weave), in other words the woven material may be made using the basic weaving process known to the skilled person. An example of a plain weave and leno weave are respectively shown in FIGS. 1A and 1B. Balanced plain weaves are fabrics in which the warp and weft are made of threads of the same size and the same number of ends per cm as picks per cm. The woven material may also be a leno weave, in which the warp yarns are arranged in pairs and are twisted around the weft yarns, keeping the weft firmly in place to provide a strong yet sheer fabric. Leno weave produces an open fabric with almost no yarn slippage or misplacement of threads.

Other types of meshes suitable for use with this invention include perforated screens sheets, plates, films or foils made of a conductive material, having a plurality of wires or threads of a non-conductive material interlaced in a direction perpendicular to the current flow, in order to ensure mechanical and dimensional stability. Still other types of meshes suitable for use with this invention include perforated sheets, plates or foils made of a non-conductive material, having a plurality of wires or threads of a conductive material interlaced in the direction parallel to the current flow. A further type of mesh suitable for use with the present invention includes lines/wires of a conductive material, which extend parallel to the current flow direction, printed on a perforated sheet, foil or plate.

The material used to produce the woven, braided, knitted mesh or screen may comprise a plurality of filaments, mono-filament or multi-filament, fibers, yarns, threads, tows, wires or cables of an electrically conductive and an electrically insulating material. Therefore, "electrically conductive paths" and "electrically insulating paths" is understood to comprise wires, filaments, mono-filament or multi-filament, fibers, yarns, threads, tows, ropes or cables of an electrically conductive material. A thread is understood to comprise a filament, a group of filaments twisted together, or a filamentous length formed by spinning and twisting short textile fibers into a continuous strand. A wire is understood to mean a single, thin, flexible thread, strand or rod of metal, which may be cylindrical, but may also have another shape. Yarn is understood to mean a continuous length of interlocked fibers. Filament, a group of filaments twisted together, or a filamentous length formed by spinning and twisting short textile fibers into a continuous strand. Strands are understood to comprise a plurality of fibers or filaments twisted, plaited, or laid parallel to form a unit for further twisting or plaiting into yarn, thread, rope, or cordage.

In the present invention the use of wires of electrically conductive material is preferred.

Figure 1B:
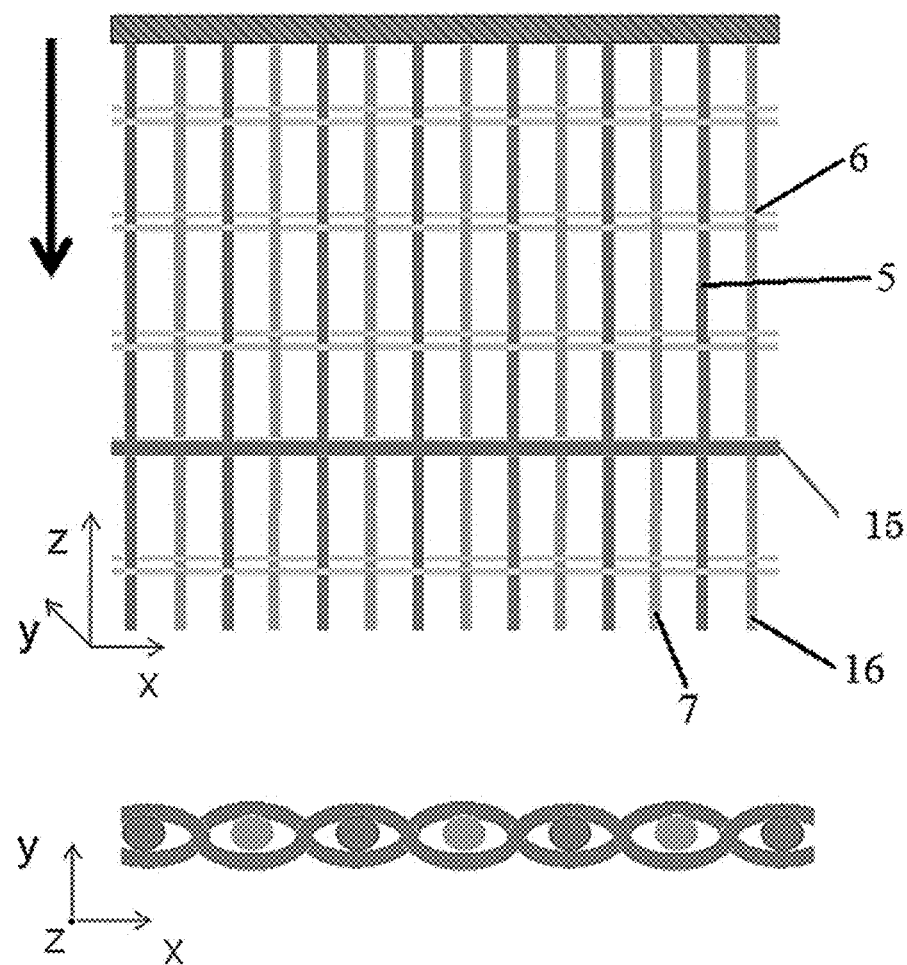
Figure 1C:
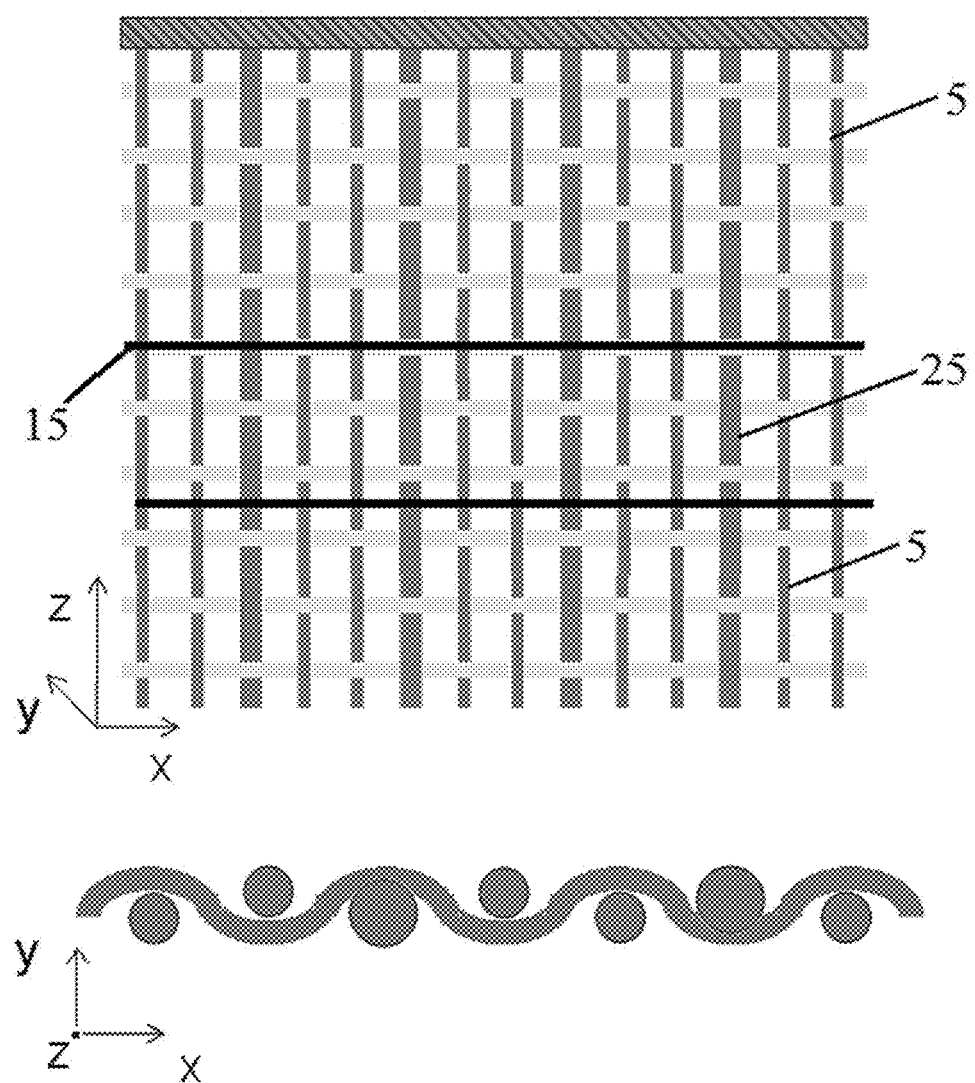
FIGS. 1C and 1D show a schematic example of a current distributor respectively comprising a plain woven material and a leno woven material, wherein part of the electric conductors in a direction parallel to the major direction of the current flow have a relatively larger average cross section than another part of the electric conductors.
Figure 1D:
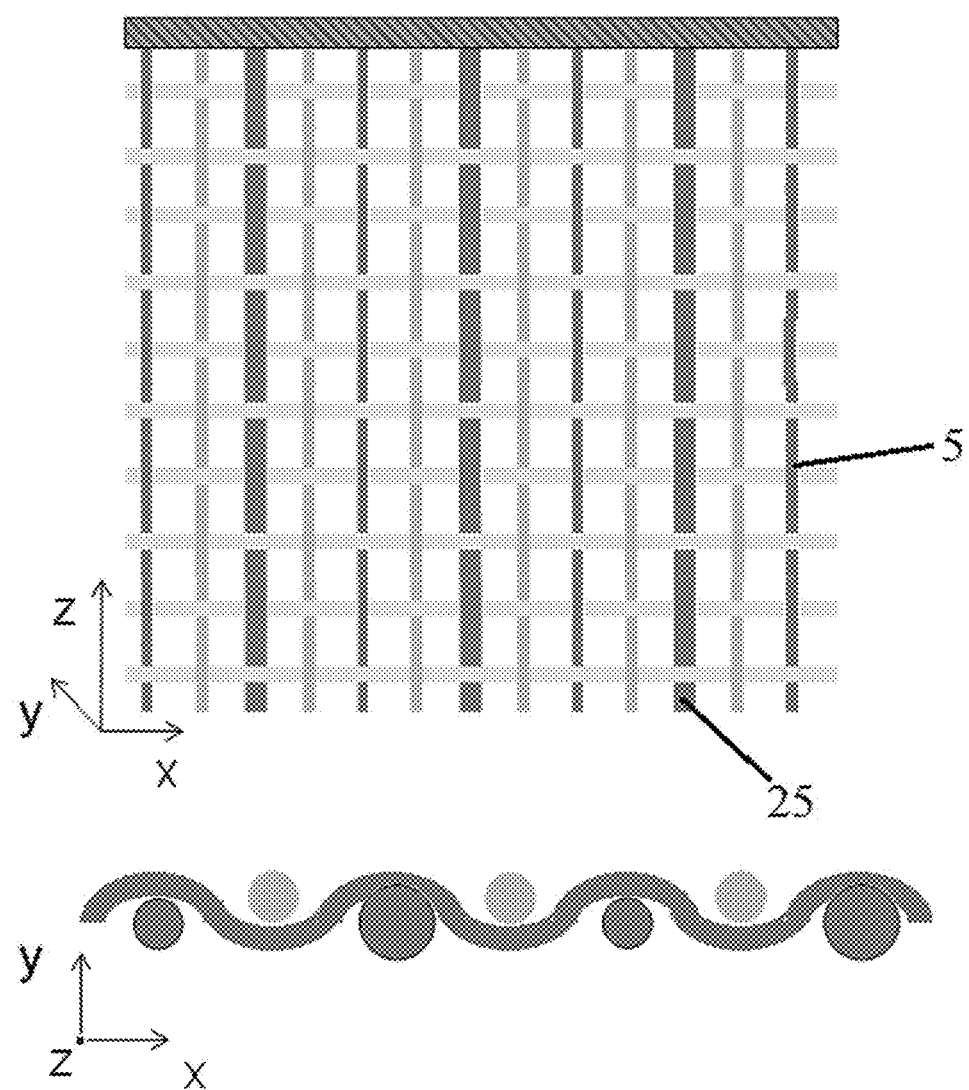

The nature and number of electrically conductive wires in the current density distributor of this invention is chosen such that the current carrying capacity of electrically conductive wires 15 in cross direction to the direction of major current flow over the current density distributor (x-direction in FIGS. 1A and 1B) is smaller than the current carrying capacity in the direction along the direction of major current flow over the current density distributor (z-direction in FIGS. 1A and 1B).

This may be achieved in that the number of electrically conductive wires 15 per length unit in the direction crosswise to the major current flow over the electrode is smaller than the number of electrically conductive wires 5 per length unit along the direction of the major current flow. In a practical example this means that the number of electrically conductive wires 15 per cm of mesh crosswise to the major current flow direction, is smaller than the number of electrically conductive wires 5 per cm of mesh along the direction of the major current flow. This may be achieved by the use of a woven mesh in which part of the electrically conductive wires in cross direction have been exchanged for threads of an electrical insulator.

According to a preferred embodiment, the number of electrically conductive wires 5, 25 per length unit in the direction along the major current flow over the electrode is increased relative to the number of electrically conductive wires per length unit in cross direction of the direction of major electric current flow, to ensure that the current carrying capacity in the direction along the major current flow may be increased and that the current flow towards parts of the current density distributor at a position remote from the current feed may be improved.

Alternatively or in addition to increasing the number of electrically conductive wires in the direction along the direction of major current flow, at least part of the electric conductive paths or wires 25 in the direction along the direction of major current flow (z-direction in FIG. 1D) have a relatively larger average cross section, and at least part of the electric conductive paths or wires 5 in the direction along the current flow have a relatively smaller average cross section. The electric conductive paths or wires 25 with a relatively larger average cross section ensure that the current carrying capacity in a direction along the major current flow may be increased and that the current flow towards parts of the current density distributor at a position remote from the current feed may be ensured.

The average diameter or cross section of the electric conductive paths or wires 5, 15,25 may vary within wide ranges, but preferably varies from 50 μm to 500 μm, preferably 75-400 μm, more preferably 100-300 μm, most preferably 150-250 μm but paths with a larger or smaller cross section may be used as well, for example 100 or 250 μm. With a smaller cross section, the number of wires can be increased while keeping a high percentage of open area.

A further weight and cost reduction may be achieved in that at least part of the paths in the direction along the direction of major electric current flow (z-direction in FIG. 1D) are made of electrically insulating material. The negligible current flow over these threads may be compensated by increasing in other areas the number of electrically conductive wires per unit length, or by inserting electric conductive wires with a larger average cross section.

When selecting an arrangement, number, shape and dimensions of electrically conductive paths and paths of electric insulator, the person skilled in the art will take into account that a sufficient electric current flow may be guaranteed over the entire current density distributor so that a sufficiently homogeneous current density distribution may be obtained, without compromising too much on the mechanical and dimensional stability of the porous mesh. The skilled person will further take care that the percentage of open area provided by the mesh is sufficiently large, and that the dimensions of the open spaces are to achieve that the current extends to a desired portion of the surface of the pores of the mesh, preferably over virtually the entire portion of the surface of the pores. This way, it may be guaranteed that a desired portion of an active layer positioned adjacent the current density distributor, may be in contact with the electrolyte as well as being reached by the current flow. In practice, a mesh will often comprise between 10 and 50 electrically conductive wires per cm, preferably between 10 and 40, more preferably between 10 and 30, most preferably between 10 and 20. However larger or smaller numbers of conductive wires may be used as well.

The electrically conductive wires and the electrically insulating threads may be arranged in a random manner in the mesh which forms the current density distributor. Similarly, the pores of the porous mesh may be arranged in a random manner. In some cases this may lead to a current density distribution and an open area available for reaction which is not as regular as would be desirable and a non uniform performance of the active layer of the electrode may be more difficult to achieve, but this will not always be the case. Therefore, preferably, the electrically conductive wires 5, 15, 25 and the non-conductive threads 6, 16 are arranged according to a regular geometric pattern as is shown in FIGS. 1A-1D and FIGS. 3A-3B. Thereby, the distance between adjacent threads of electrically insulating material in x direction may be the same as the distance in z direction, or it may be different. The distance between adjacent threads of electrically insulating material in respectively x or z direction may be constant over the entire mesh, or may vary according to a regular pattern. Similarly, the distance between adjacent threads of electrically conductive material in x direction may be the same as the distance in z direction, or it may be different. The distance between adjacent threads of electrically conductive material in respectively x or z direction may be constant over the entire mesh, or may vary according to a regular pattern. In case the use of the electrolytic cell so requires, the electrically conductive wires 5, 15, 25 and the non-conductive threads 6, 16 may also be are arranged in a random manner.

Preferred porous meshes are those which present a sufficiently large percentage of open area, in order to ensure that the reactants can penetrate the porous mesh and contact the electrochemically active layer. Therefore, the current density distributor will usually have an open structure, in particular in the x-z plane. The % of open area of a square mesh may be represented by the formula I below (see FIG. 2A):

$$\%OPEN\ AREA = \frac{\sum_i x_{i1} - y_{i1}}{\sum_i x_{i2} - y_{i2}} \times 100 \qquad \text{formula I}$$

For a more general example of a non-square mesh, the % of open area is represented by the ratio of the surface of the open area to the sum of the open area and the closed area. Particularly preferred porous meshes are those with an open area of at least 48%, preferably in the range of 60-80%.

The contact positions where the active layer contacts the current density distributor, screen areas of the active layer from the reaction medium and thereby risk to locally reduce the reaction yield that may be achieved by the electrolytic cell. The person skilled in the art will however be capable of selecting the percentage of open area in such a way that an optimum compromise is achieved between providing a sufficient dimensional and mechanical stability on the one hand, and a sufficiently large available reactive surface of the active layer. In practice this means that the skilled person will be capable of selecting an appropriate number of electrically conductive and electrically insulating paths per unit length, and an appropriate average cross section to achieve an optimum compromise between a sufficient dimensional and mechanical stability on the one hand, and a sufficiently large available reactive surface of the active layer on the other hand.

To achieve an open area that is as large as possible while maintaining a good dimensional stability, preferably the electrically conductive wires and the threads of electric insulator have approximately the same average cross section, and a similar number of electrically conductive wires and threads of electric insulator is present in a direction along the major current flow and the direction crosswise of the major current flow. With similar is meant a ratio of electrically conductive wires to threads of electric insulator of 1:1.5, preferably 1:1.25, more preferably 1:1.1, most preferably 1:1.

The dimensions of the current density distributor according to the invention may vary within wide ranges, but preferably the conductive and insulating material is selected such that the average thickness of the current density distributor in y direction is at least 100 µm, preferably at least 120 µm in order to ensure a sufficient dimensional stability. The average thickness of the current density distributor will usually not be more than 750 µm, with less than 600 µm being preferred and less than 500 µm or even less than 400 µm being particularly preferred. With larger average thickness, the thickness of the electrode risks to become too high and with several electrodes mounted into an electrolytic cell the space occupied by the electrolytic cell may become to large. More preferably the thickness of the current density distributor varies from 150-400 µm, in particular from 200-300 µm. This range provides an optimum compromise between minimizing the electrical resistance and providing a sufficiently large fraction of open spaces.

Within the scope of this invention, the electrically conductive paths may comprise a wide variety of electrically conductive materials. Materials suitable for use as an electrical conductor with the present invention include solid state materials with an electrical conductivity of at least 1.25×10E3 S/m at 20° C. and atmospheric pressure. The resistivity of the electrically conductive paths is preferably less than 8×10E(−4) Ohm·m, more preferably less than 10E(−6) Ohm·m. Therefore, within the scope of the present invention, "electrical conductor" is understood to mean materials with an electrical conductivity of at least 10E6 S·m$^{-1}$ at 20° C. and atmospheric pressure, and a resistivity of preferably less than 8×10E(−4) Ohm·m. However, when use is made of a material for electrically conductive paths of an electrical insulator thread coated with an electrically conductive material, the above-described material properties may be different.

Examples of electrically conductive material suitable for use with this invention include, without being restricted thereto, intrinsically conductive polymers (ICP's) which may be doped or undoped with an electrically conductive material, alloys of metals for example alloys of gold, iridium, platinum, rhodium, palladium, silver, copper, nickel, zinc, tungsten, titanium, aluminum, tin, but the pure metals may be used as well. Preferred electrically conductive materials include stainless steel alloys, more preferably austenitic stainless steels and duplex stainless steel. Duplex stainless steels typically contain approximately 22-25 wt. % of chromium and 5 wt. % of nickel, some molybdenum and nitrogen. Duplex steels may be preferred for their high yield strength and stress corrosion cracking resistance to chloride, when compared to austenitic stainless steels. The latter may be preferred for their superior corrosion resistance over duplex stainless steel, and because of their low magnetic properties. Austenitic stainless steels and duplex stainless steel are preferred because of their good corrosion resistance, and minimal magnetic properties. Intrinsically conductive polymers conduct electricity due to the intrinsic nature of its chemical structure. Examples of intrinsically conductive polymers suitable for use with this invention include poly(3,4-ethylenedioxythiophene) (PEDOT), polypyrrole, polyaniline (PAM), polyacetylene, poly-p-phenylene, poly-p-phenylene ethylene, polythiophene, polyfluorene The skilled person will be capable of selecting the most appropriate electrically conductive material taking into account the desired chemical resistance in the reaction medium, and/or the desired electrochemical stability and corrosion resistance, the envisaged operational conditions, in particular the operational voltage range, current range, composition of the electrolyte in particular the pH and ions present in the reaction medium.

Suitable electrically conductive materials preferably offer a tensile strength that is sufficiently high, to offer the desired strength/hardness/stiffness/resistance to deformation and minimize the risk to deformation during use, also in case the temperature of the material of the current density distributor raises. Therefore, preferred electrically conductive materials preferably offer a tensile strength of at least 120 MPa, more preferably higher than 190 MPa, most preferably higher than 300 MPa, in particular at least 450 MPa. With ultimate tensile strength or tensile strength at break is meant, the force per unit area (MPa or psi) required to break a material under tensile stress measured according to ISO 527 or ASTM D638. The yield strength or yield point is defined as the stress at which a material begins to deform plastically.

Within the scope of this invention, electrically insulating materials are understood to comprise those material which have an electrical resistance at 20° C. which is higher than 10E12 Ohm·m, preferably higher than 10E16 Ohm·m.

A wide variety of electrical insulating materials are suitable for use with the present invention, for example polyarmides, polyesters, polyolefins, polyetherketone, polyphenylene sulfide (PPS), polyether imide (PEI) etc. Suitable examples of polyolefins include UHMWPE, HDPE, polypropylene or the like. A suitable example of a polyester includes polyethylene terephthalate (PET). Other suitable materials include fluoroplastics for example PTFE, ETFE, FEP, PFA, EFEP, PCTFE, aliphatic polyamides. The aforementioned materials may be used alone or in any combination. The electrically insulating path may in addition comprise fibers made of glass, ceramics, mineral fibers, carbon fibers etc. in an appropriate ratio to the above-mentioned plastic fibers. Therefore a suitable material for use as electrically insulating path is a monofilament or thread made of composite material comprising a polymeric matrix of one or more of the polymers indicated above and a reinforcing component, such as glass fiber, ceramic fiber, carbon fiber distributed therein.

Preferred electrically insulating materials are those which offer a sufficiently high tensile strength, in combination with a sufficient compression resistance, to minimize the risk to deformation of the current density distributor during use. Preferred materials are those which offer a tensile of at least 15 MPa, more preferably at least 40 MPa, most preferably at least 55 MPa, in particular at least 100 MPa. Preferred materials offer a compression strength which is higher than 20 MPa, more preferably higher than 55 MPa, most preferably higher than 80 MPa, in particular higher than 100 MPa. With tensile strength or tensile strength at break is meant, the force per unit area (MPa or psi) required to break a material under tensile stress measured according to ASTM D882 or ASTM D412, depending on the nature of the material. The paths of electrical insulator preferably have an average cross section of 50 µm to 250 µm, preferably 60-200 µm, more preferably 60-150 µm.

Thus, preferably the current density distributor is selected from the group consisting of a metal type, a metal-plastic type, a mixed metal type, a mixed metal-plastic type, a mixed metal-metal type, a mixed metal-metal-plastic type a mixture of metal and other non-metallic conductive (such as conductive polymers and conductive carbon e.g. graphite, grapheme and carbon nano-tubes), or non-conducting material (such as plastic), a porous electrically conductive web and any combination thereof.

According to another preferred embodiment of the present invention, the current density distributor may further comprise a porous electrically conductive web, for example a carbon electrode e.g. a pitch-bonded carbon electrode or a carbon foam, a metal-cast electrode or a metallic electrode e.g. a punched metal sheet, a woven metallic material, a metallic mesh, a metallic screen, a metal gauze, a metallic foam or an electrically conducting net or array. The selection of material for the porous electrically conductive web is dependent upon the requirements of the application. Suitable materials include stainless steel and nickel. The pore size in the porous electrically conductive web is preferably in the range of 149 µm to 840 µm. According to another preferred embodiment, the current density distributor further comprises a chemically or thermally treated porous electrically conductive web e.g. to avoid corrosion in strongly acidic electrolytes.

According to still another preferred embodiment of the invention, the current density distributor further comprises a porous electrically conductive web in direct contact with the current density distributor, which is an electrically conductive material with even higher electric conductivity that will take away or bring the electron from and to the porous electrically conductive web.

The present invention provides a current density distributor which provides an optimum compromise between maximizing the current flow over substantially the entire surface area of the current density distributor, optimizing the current distribution over the surface of the current density distributor taking into account the spaces of open area in the current density distributor on the one hand and keeping the material cost and weight of the current density distributor as low as possible on the other hand, while still guaranteeing a sufficient mechanical and dimensional stability. The present invention provides a current density distributor which is capable of providing an improved electrical current density distribution, since its configuration permits reducing internal current losses which would be due to ohmic polarization.

The present invention also relates to a gas diffusion electrode comprising at least one current density distributor as described above or a plurality of such current density distributors, wherein the electrode may either be an anode or a cathode. To one face of the current density distributor an active layer is arranged, a hydrophobic or water repellant layer is arranged to the opposite face of the current density distributor. According to the present invention either the entire face of the current density distributor may be covered by the active layer, respectively the hydrophobic layer, or only part of it. Similarly, the current density distributor of the present invention may be arranged to part of the surface of the active layer, but is preferably arranged to the entire surface of the active layer. "Water Repellent Layer" (WRL), is understood to comprise a layer having an external surface in contact with gas with porosity to the gas and the capability of preventing leakage of an aqueous electrolyte to the external surface of the gas diffusion layer. "Electrochemically Active Layer" is a layer in which the electrochemical reaction takes place having high electrical conductivity and porosity to gas and electrolyte and having an interface with electrolyte on one surface and a water repellant (hydrophobic gas diffusion) layer on the other.

The invention is further elucidated in the examples and comparative examples below.

Figure 3A:
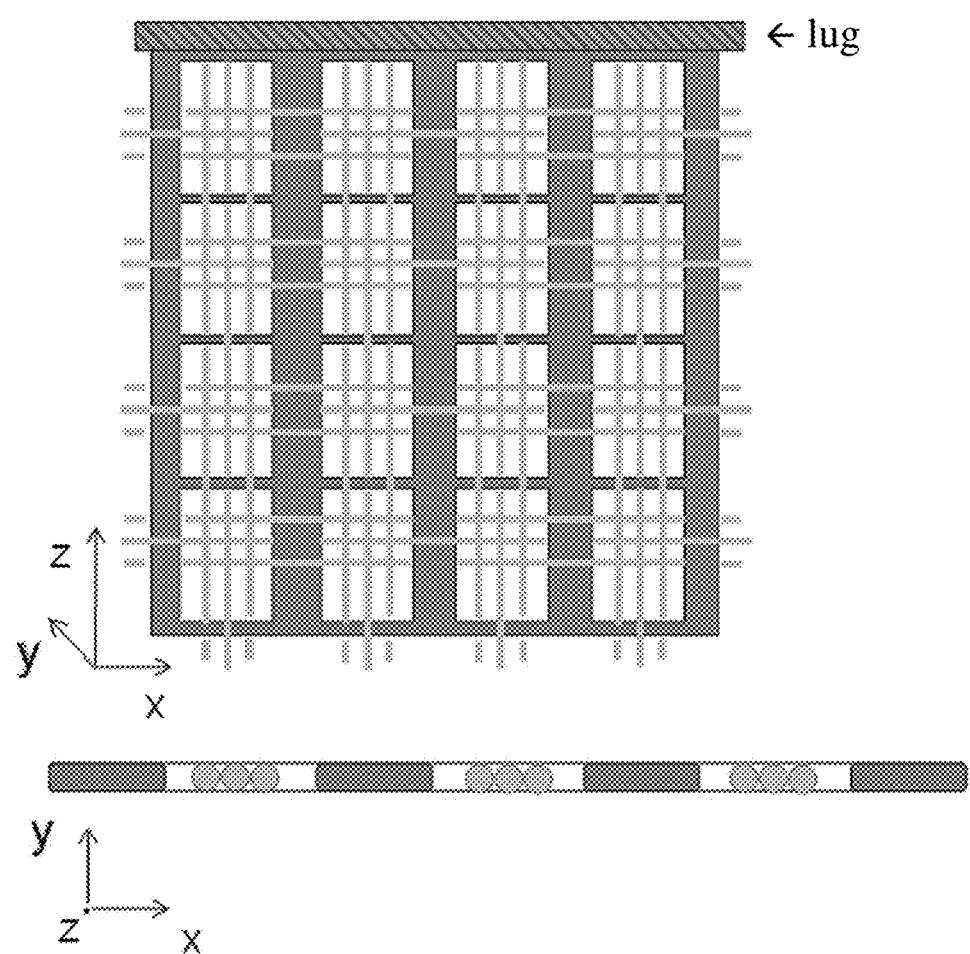
FIG. 3A shows a schematic example of a current distributor respectively comprising a plain woven material and a leno woven material, wherein part of paths in a direction parallel to the major direction of the current flow are made of an electric isolating material.
Figure 3B:
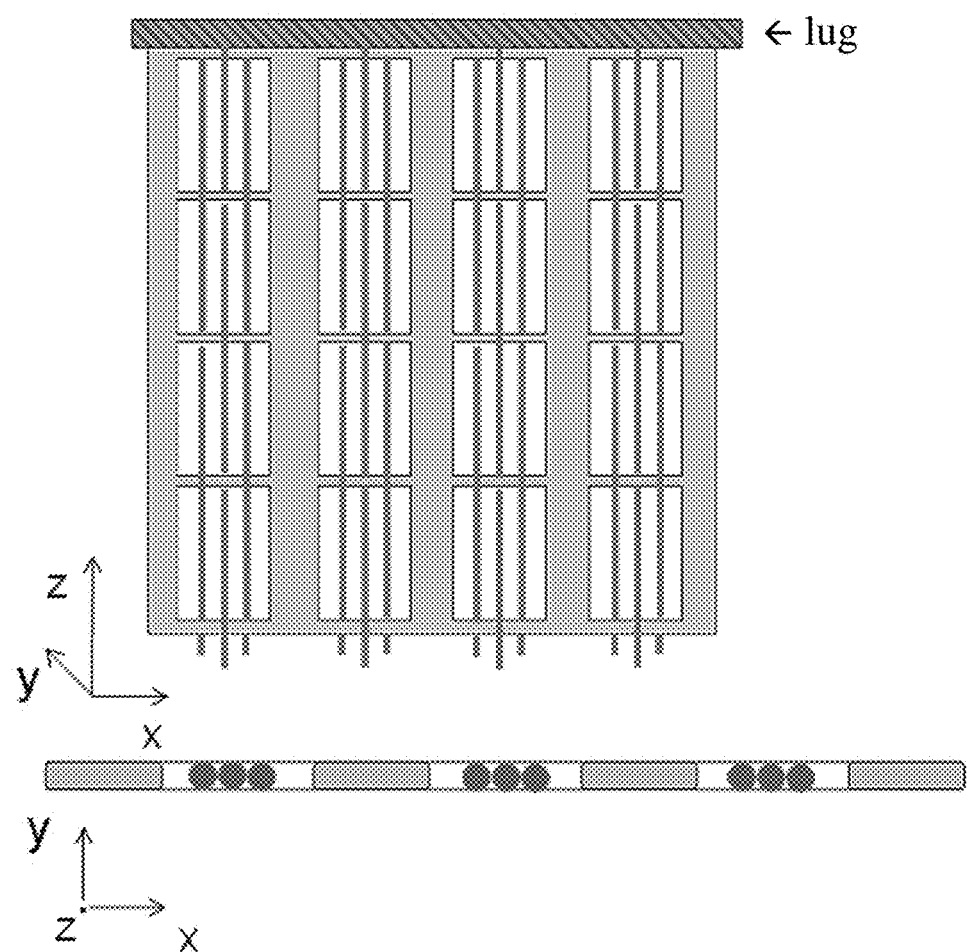
In FIG. 3B non-conductive yarns have been braided/interlaced into a perforated conductive foil.
Figure 4A:
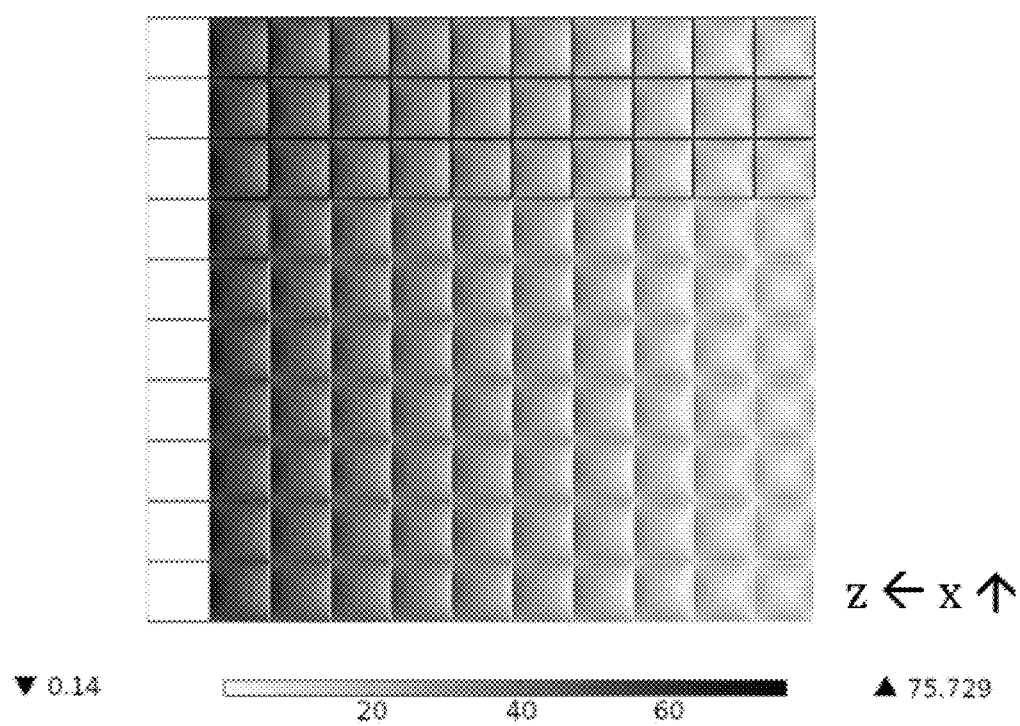
FIGS. 4A, 5A, 6A, and 7A show the current density distribution calculated using the above described computational model in x and z direction for a current collector having respectively 10 electrically conductive wires evenly distributed over a length of 10 cm in z direction along the direction of major current flow, and respectively 10, 15, 20 and 30 electrically conductive wires in x direction, perpendicular to the main flow of electric current, evenly distributed over a length of 10 cm.
Figure 4B:
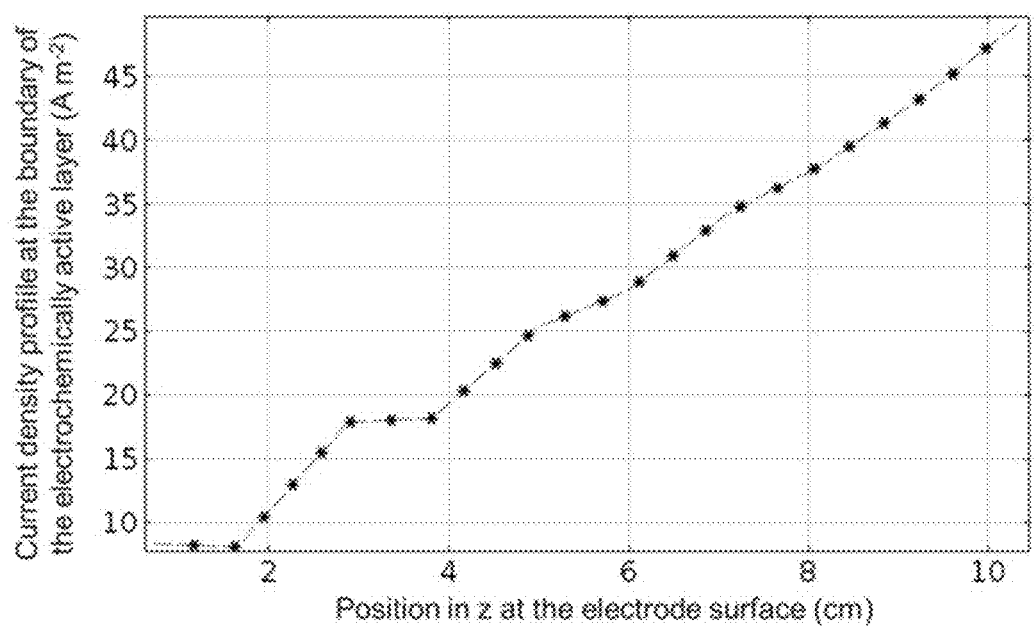
FIGS. 4B, 5B, 6B, and 7B show the electric current density distribution corresponding to the current collectors of respectively FIGS. 4A, 5A, 6A, and 7A.
Figure 5A:
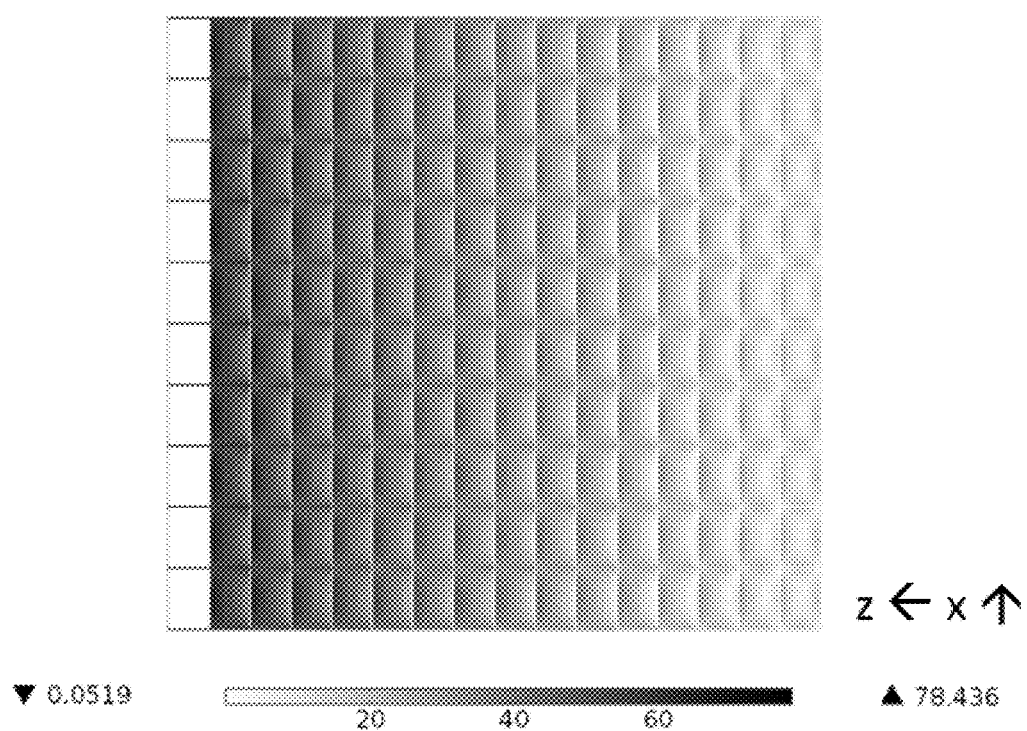
Figure 5B:
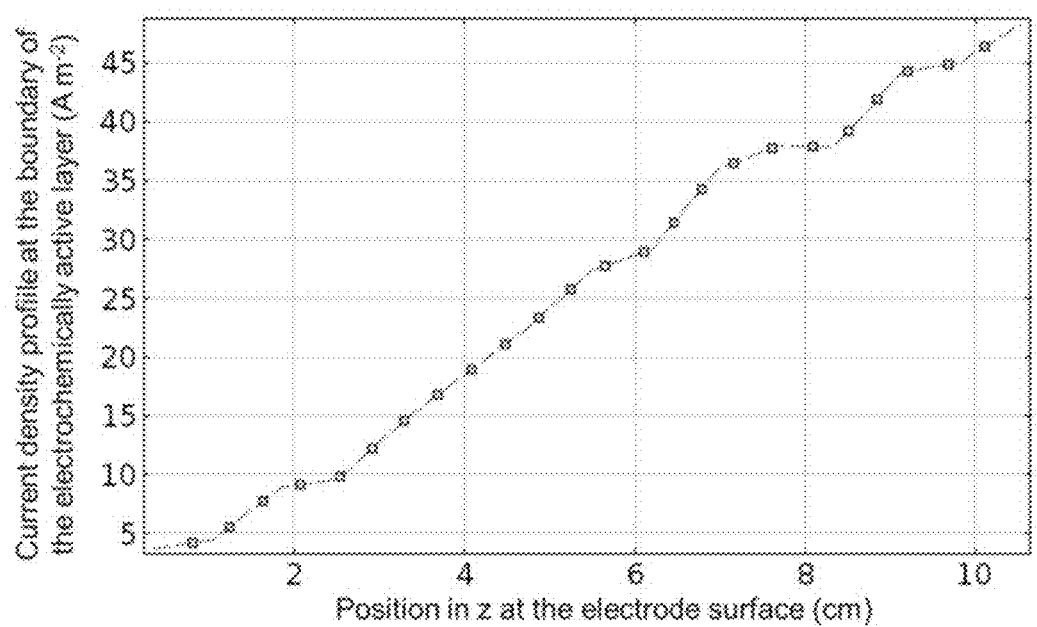
Figure 6A:
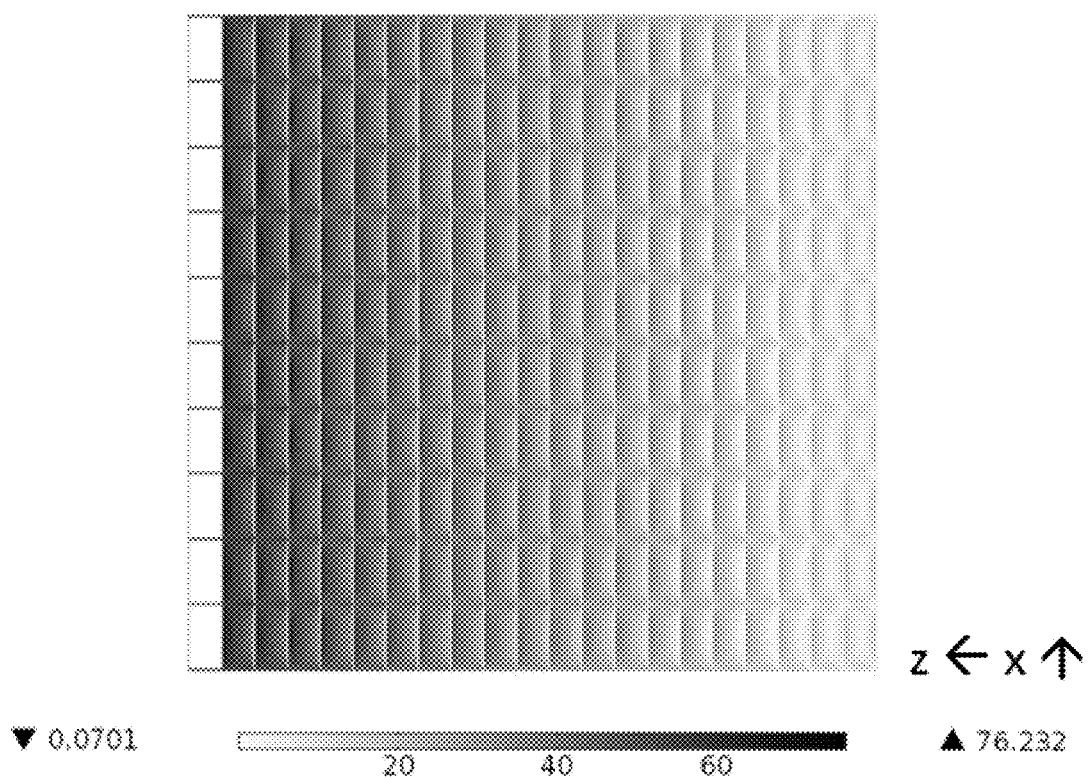
Figure 6B:
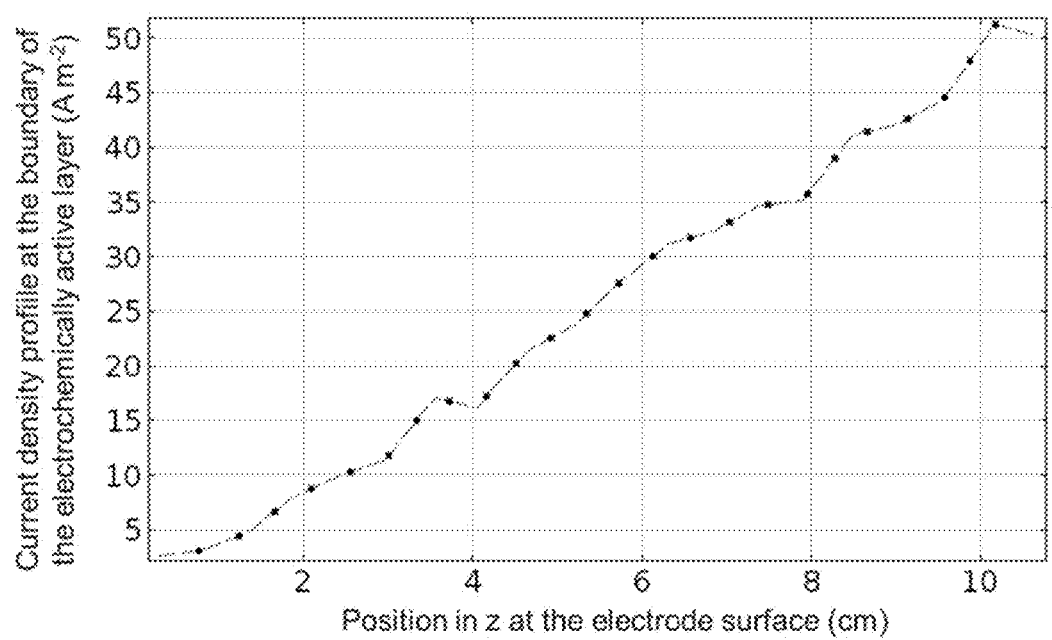
Figure 7A:
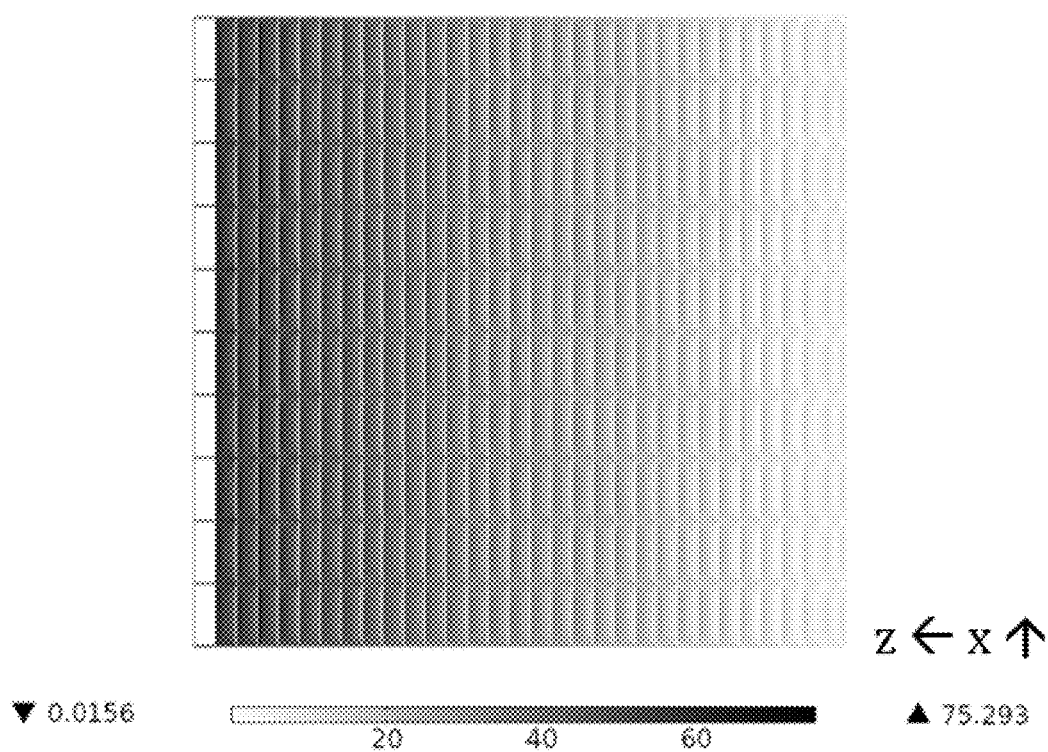
Figure 7B:
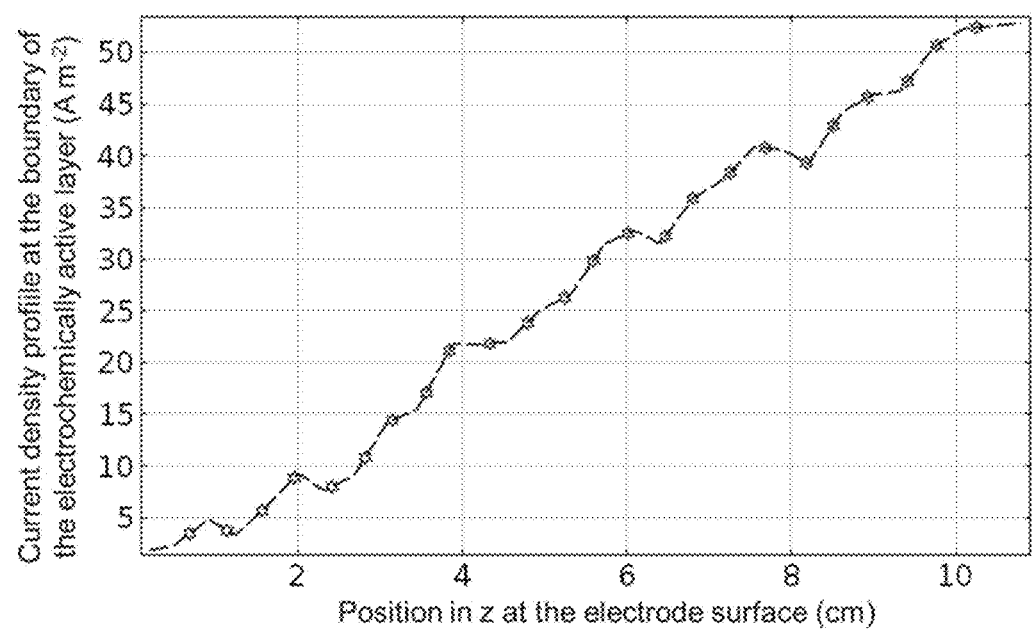

The examples below make use of an electrode and a current density distributor with a square geometry as shown in FIGS. 3A-3B and an electrochemical half cell containing such an electrode. The electrochemical half cell contains a current density distributor. The current density distributor comprises a square porous web comprising a plurality of wires of an electrically conductive material which extend in z direction of the mesh, and a plurality of wires of an electrically conductive material which extend in x direction of the mesh. The mesh is made of a plurality of electrically conductive wires with an average cross section of 0.25 mm. The dimensions of the current density distributor in x and z direction are respectively 10 cm×10 cm, and 0.25 mm in y direction. The current density distributor is mounted into an electrically conductive frame. The current is assumed to flow in the direction indicated by the arrow, the z direction. A lug of an electrically conductive material is mounted to the side of the frame along which electrical current is fed to the current density distributor. The dimensions of the lug in respectively x and z direction are 11 cm×1 cm, and 0.25 mm in y direction. The electrolyte is in full contact with the electrochemically active layer, thus having dimensions of 10 cm×10 cm (x and z directions), with a thickness of 0.5 cm (y direction). The thickness of the electrochemically active layer was set at 0.25 mm, to match that of the current density distributor.

To on one face of the current density distributor, a layer of an electro catalytically active material has been arranged, in particular a matrix of a porous active carbon material. The active material extends partly in the pores of the porous current density distributor. The active layer is considered to be in direct contact with the electrolyte. In some embodiments, the catalytically active material is selected from the group of one or more micro-organisms, one or more enzymes, one or more organo-metallic compounds, one or more inorganic and/or organic compounds.

The current density distribution over the current density distributor is calculated using the COMSOL Multiphysics primary current distribution premises available from Comsol (The Netherlands). The following assumptions have been made: the passage of current through the current density distributor is controlled by the ohmic resistance of the current density distributor. The electrode and current density distributor which are adjacent to the electrolyte are considered to be equipotential surfaces, it is assumed that the concentration of ions within the electrolyte is uniform. Activation over-potentials due to electrode kinetics, and concentration over-potentials due to mass transfer have been neglected. The electrodes are considered as perfect electric conductors, the electrode potential ($\Phi_M$) is assumed to be constant. The outer surface of the electrodes is considered to be insulating ($\nabla\Phi_s=0$). The conductivity of the electrolyte ($\kappa$) and the electrolyte potential over the electrodes ($\Phi_S$) are assumed to be constant. The electrode is considered to be out of equilibrium, this is $E>E_{eq}$. Both electrolyte and electrode obey Ohm's Law ($j=-\kappa\nabla\Phi_s$, where j refers to the current density).

The stationary model considers the solution of the primary current density distribution at the interfaces concerning the current density distributor, the electrochemically active layer and the electrolyte.

It is assumed that a discharge current of 20 mA is applied through the lug. The equilibrium potential $\Phi_S+\Phi_M=0.7$ V. This condition is effective at the boundary between the electrochemically active layer and the current density distributor. The electrical conductivity of the current density distributor is assumed to be $4.8\times10^6$ S m$^{-1}$, this value is representative for a current density distributor made of good electrically conducting materials such as stainless steel, copper, austenitic steel, etc. The electrical conductivity of the electrochemically active layer is $9.5\times10^2$ S m$^{-1}$ for, this value is representative for semiconducting materials such as graphite, activated carbon and other forms of amorphous carbon. The conductivity of the electrolyte is 10 mS cm$^{-1}$.

Example 1: Impact of the Number of Electrical Conductors Per Length Unit in on the Current Distribution Density Over the Current Density Distributor of a Porous Electrode Example 1 shows the impact of the number of electrical conductors per length unit in x direction, i.e. the direction perpendicular to the direction of the main current flow, on the current distribution density profile of a porous electrode, using computational modeling based on a three-dimensional model.

In z direction, 10 wires were evenly distributed over a length of 10 cm. The wires were positioned at a regular distance from each other. The number of electrically conductive wires in x direction perpendicular to the main current flow was varied as follows: respectively 10, 15, 20 and 30 wires were provided over a length of 10 cm. The wires were positioned at a regular distance from each other, so that a mesh with a regular rectangular pattern was obtained.

FIGS. 4A, 5A, 6A, and 7A respectively show the electric current density distribution corresponding to a current density distributor having 10 electrically conductive wires in z direction, and respectively 10, 15, 20 and 30 electrically conductive wires in x direction (perpendicular to the main flow of electric current), evenly distributed over a length of 10 cm. FIGS. 4B, 5B, 6B, and 7B show the current density profile along the z-axis of the electrochemically active layer, corresponding to the current density distributors of respectively FIGS. 4A, 5A, 6A, and 7A.

From FIGS. 4B, 5B, 6B, and 7B it can be appreciated that the number of electrically conductive wires present per length unit in a direction perpendicular to the main current flow, does not have a significant impact on current density or its distribution over the electrode.

Example 2: Impact of the Number of Electrical Conductors Per Length Unit in on the Current Distribution Density Over the Current Density Distributor of a Porous Electrode The number of wires per length unit in the current density distributor was varied in z direction, in particular a direction parallel to the main current flow as follows: respectively 15, 20 and 30 wires were evenly distributed over a length of 10 cm. In x direction, 10 wires were evenly distributed over a length of 10 cm.

Figure 8A:
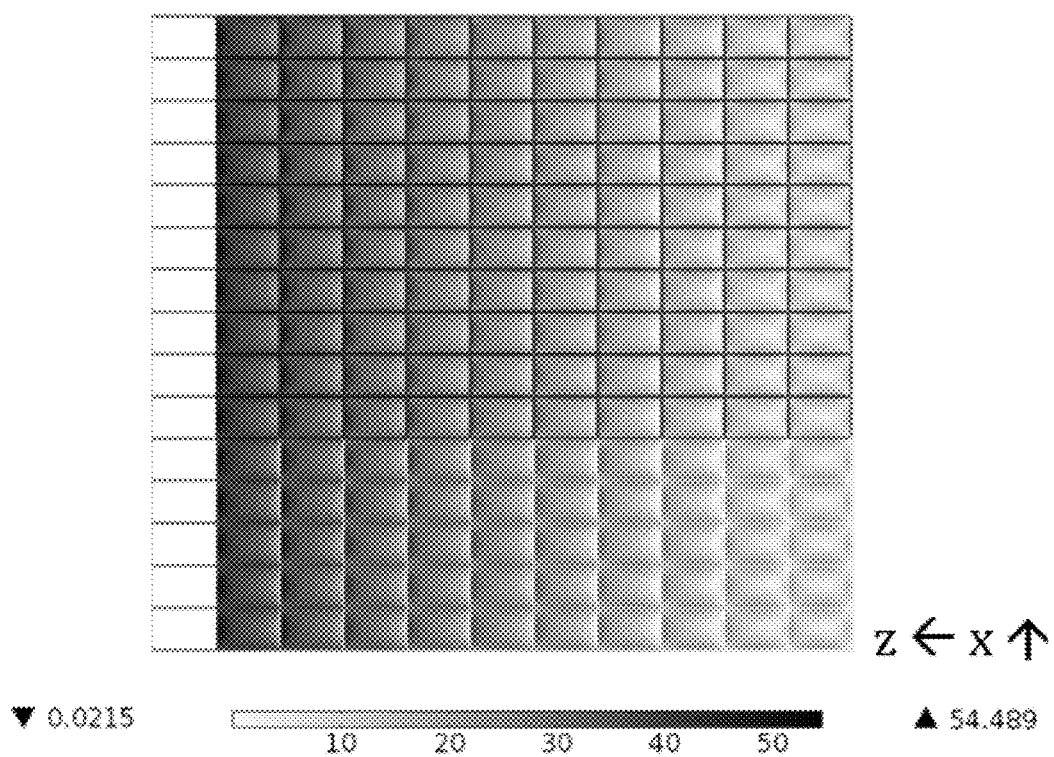
FIGS. 8A, 9A, and 10A respectively show the electric current density distribution over a current density distributor having 10 threads of a non-conductive plastic material evenly distributed over a length of 10 cm in a direction perpendicular to the direction of main current flow (x-axis), and respectively 15, 20 and 30 electrically conductive wires evenly distributed over a length of 10 cm in the direction along the main current flow (z-axis).
Figure 9A:
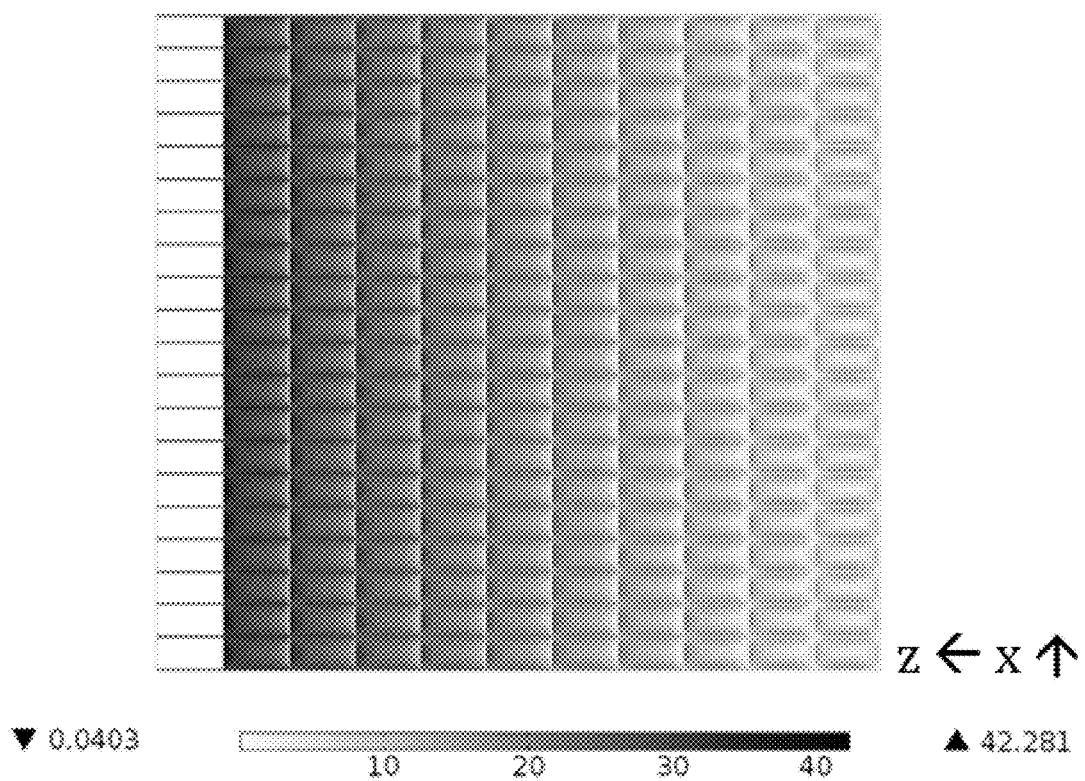
Figure 10A:
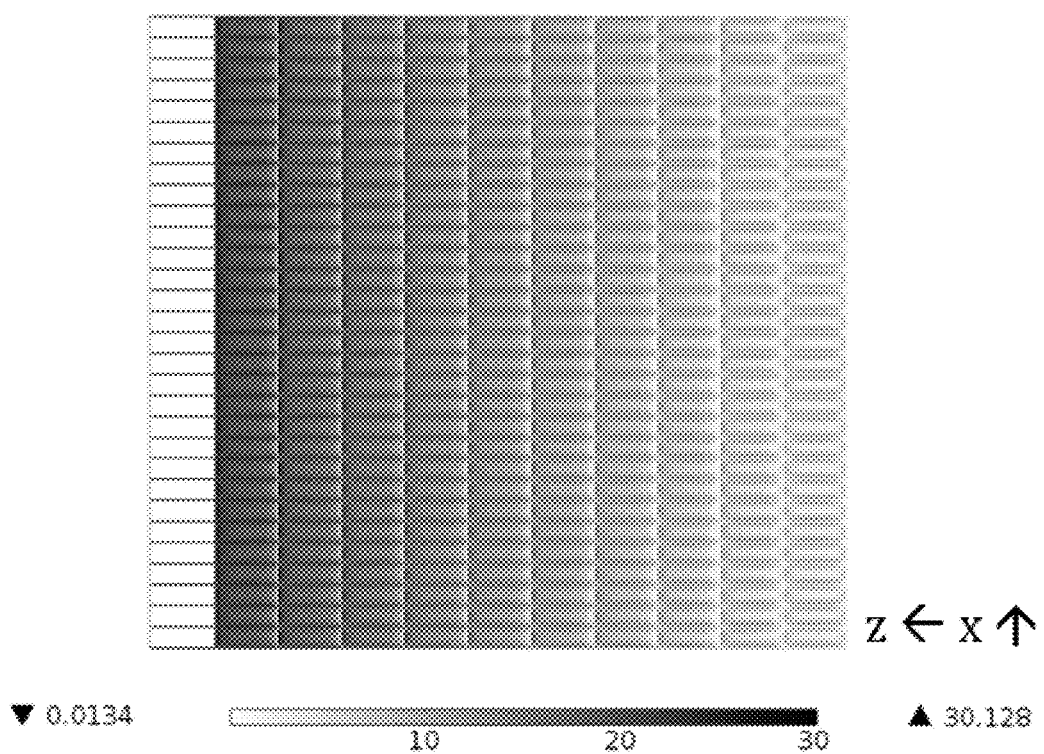

FIGS. 8A, 9A, and 10A respectively show a current density distributor having 10 electrically conductive wires in x direction (perpendicular to the main flow of electric current), evenly distributed over a length of 10 cm, and respectively 15, 20 and 30 electrically conductive wires in x direction (perpendicular to the main flow of electric current), evenly distributed over a length of 10 cm.

Figure 8B:
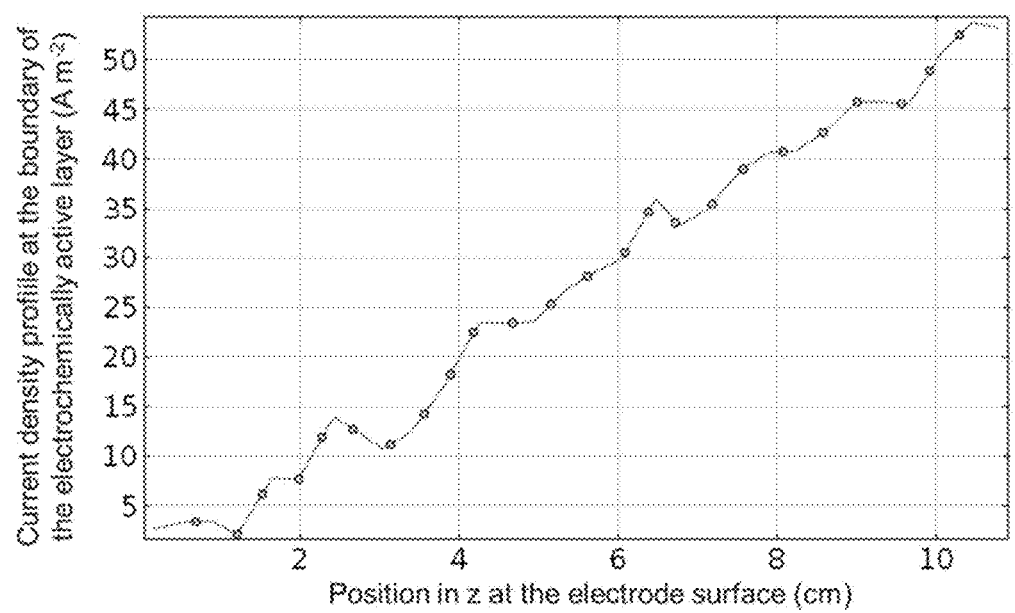
FIGS. 8B, 9B, and 10B show the corresponding current density profile along the z-axis.
Figure 9B:
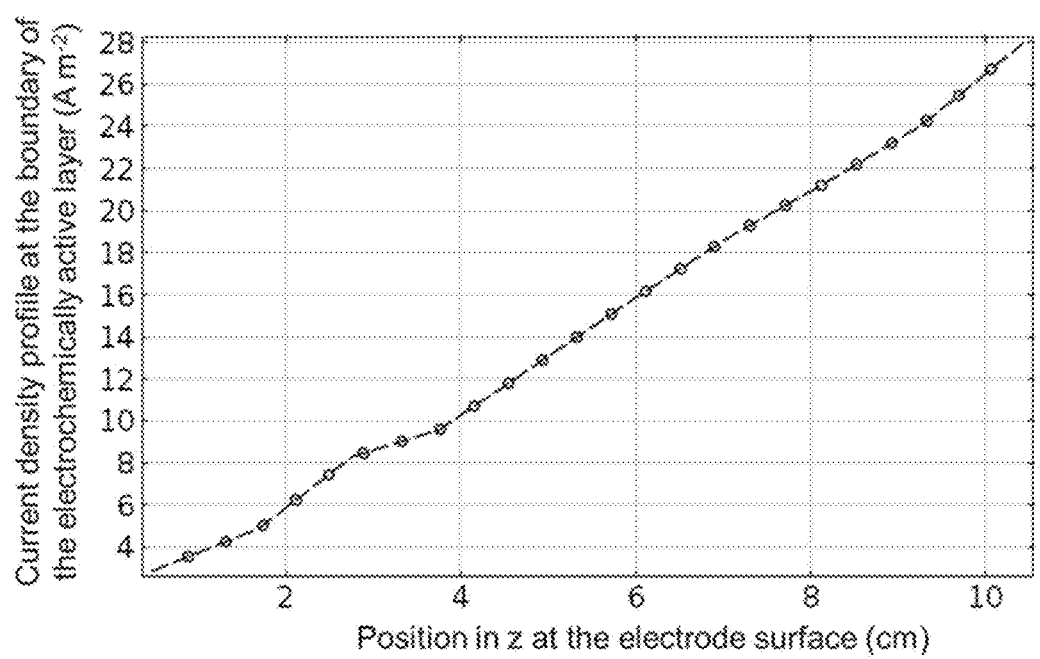
Figure 10B:
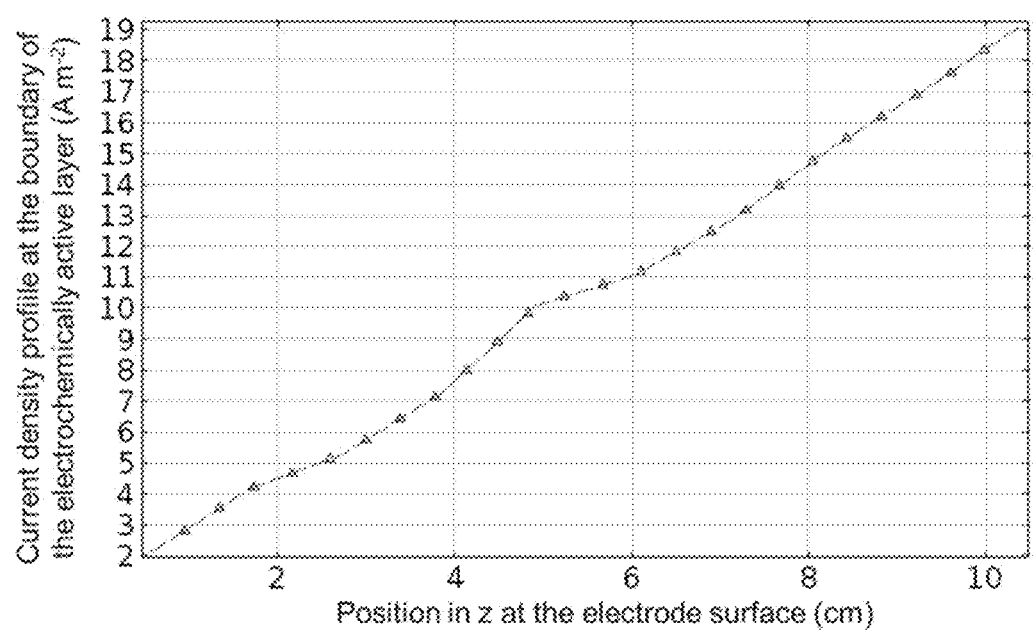

FIGS. 8B, 9B, and 10B show the current density profile along the z-axis of an electrochemically active layer, corresponding to the current density distributors of respectively FIGS. 8A, 9A, and 10A.

From FIGS. 8B, 9B, and 10B it can be appreciated that varying the number of electrical conductors per length unit in a direction parallel to the main current flow (z direction), has a significant impact on current density distribution across the electrode. The comparison of FIG. 8B with FIG. 9B shows that increasing the number of electrically conductive wires in z direction, parallel to the main current flow, improves the homogeneity of the current density distribution over the current density distributor. Thus, a larger area of the electrochemically active layer located on other positions of the electrode will have a higher current density, and the voltage drop across the electrode may be reduced. The smaller voltage drop across the electrode presents the advantage that when used in a chemical reaction, the kinetic reaction rate and reaction selectivity may be improved over electrodes with a larger voltage drop across the electrode.

From FIGS. 8A and 8B it can be observed that with a smaller number of wires per length unit in a direction parallel to the main direction of the current flow, the current density magnitude in z direction is higher in some areas of the electrode (e.g. 50 A m$^{-2}$) than in other areas. In practice this means that a large area of the electrochemically active layer located on the opposite side of the electrode will have to operate at rather low current densities (e.g. at z=0). This effect is associated with a large voltage drop across the electrode. The large voltage drop across the electrode presents the problem that when used in a chemical reaction, the kinetic reaction rate and reaction selectivity will be inferior in comparison to an electrode with a smaller voltage drop across the electrode.

Example 3

Figure 11A:
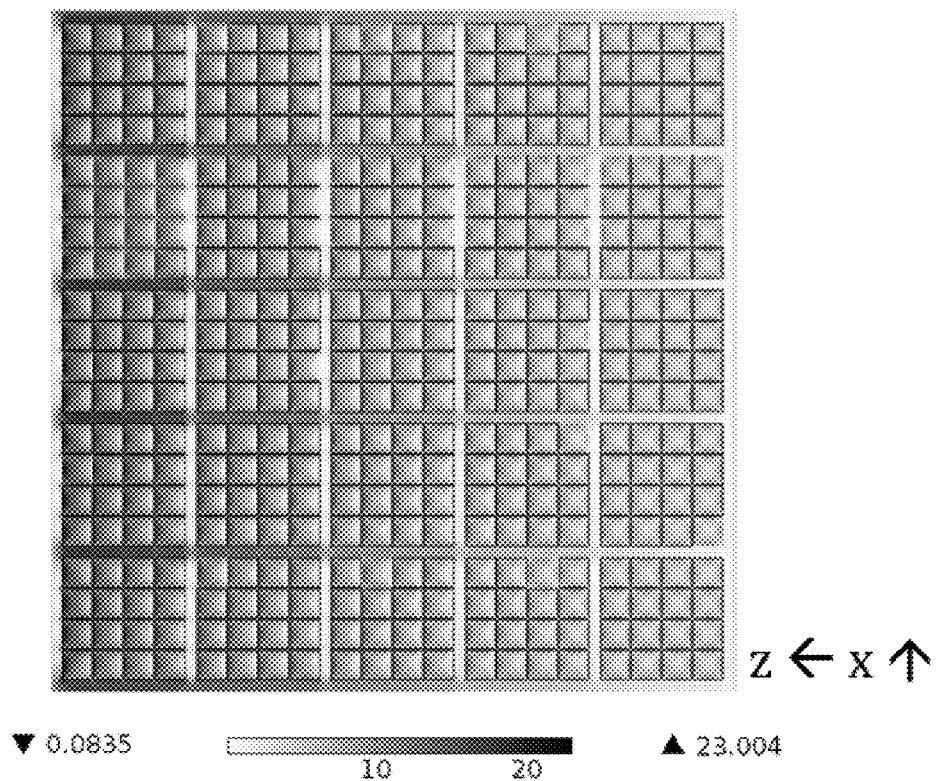
FIGS. 11A, 12A, and 13A show the electric current density distribution for a current density distributor having in a direction perpendicular to the direction of main current flow (x-axis) a plurality of electrically conductive wires with a thickness of respectively 2 mm, 1 mm and 0.5 mm, the remaining electrically conductive wires having a thickness of 0.25 mm.
Figure 11B:
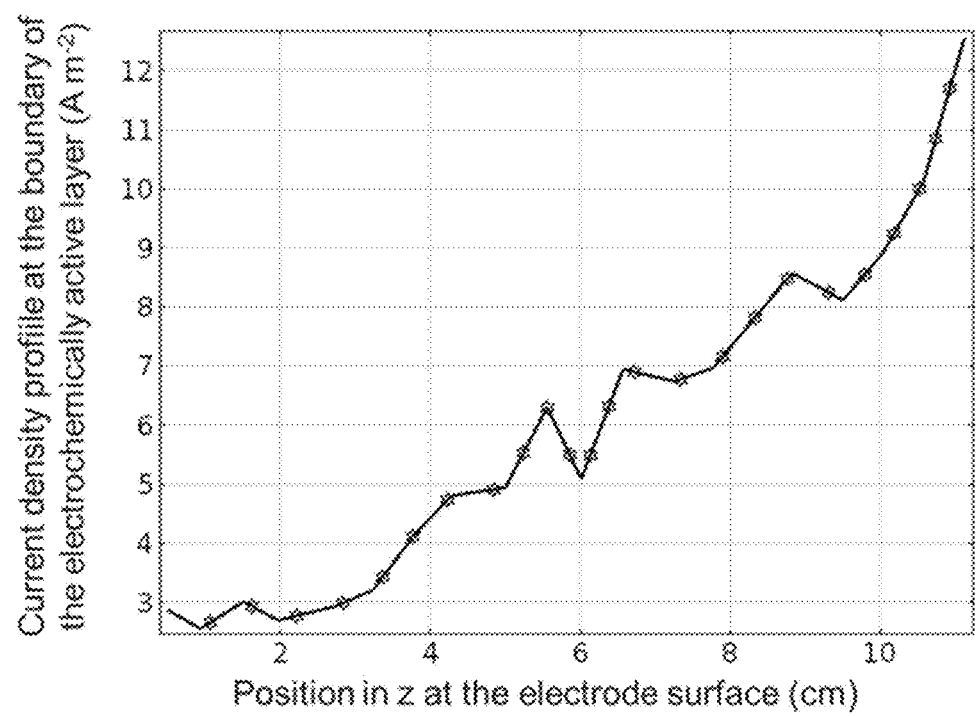
FIGS. 11B, 12B, and 13B show the corresponding current density profile along the z-axis.
Figure 12A:
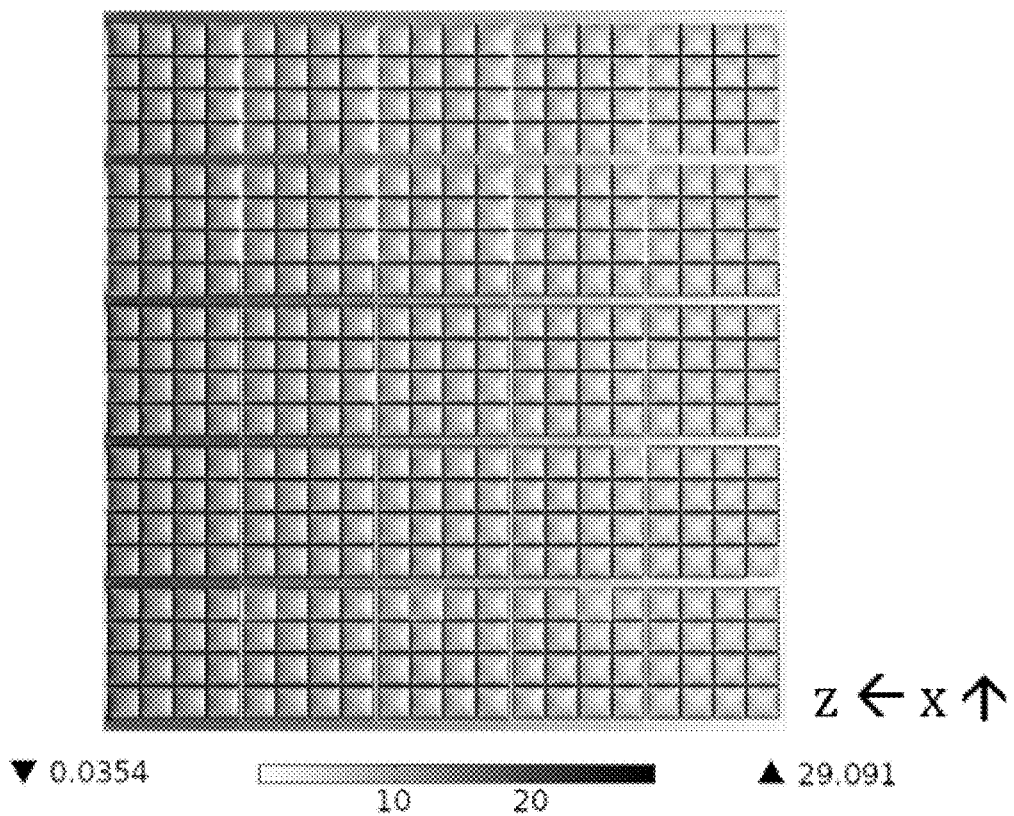
Figure 12B:
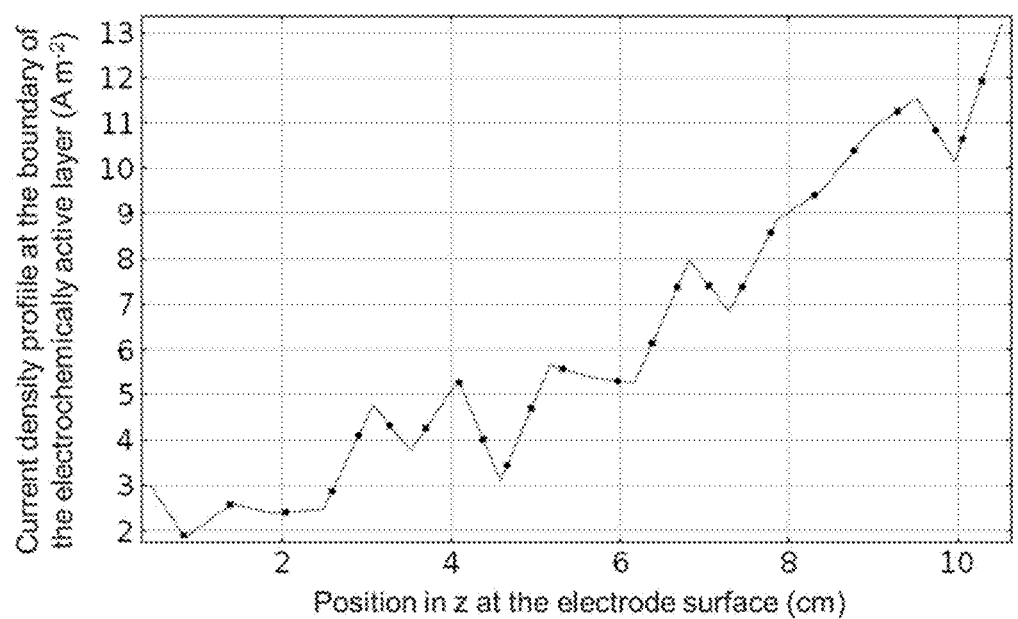
Figure 13A:
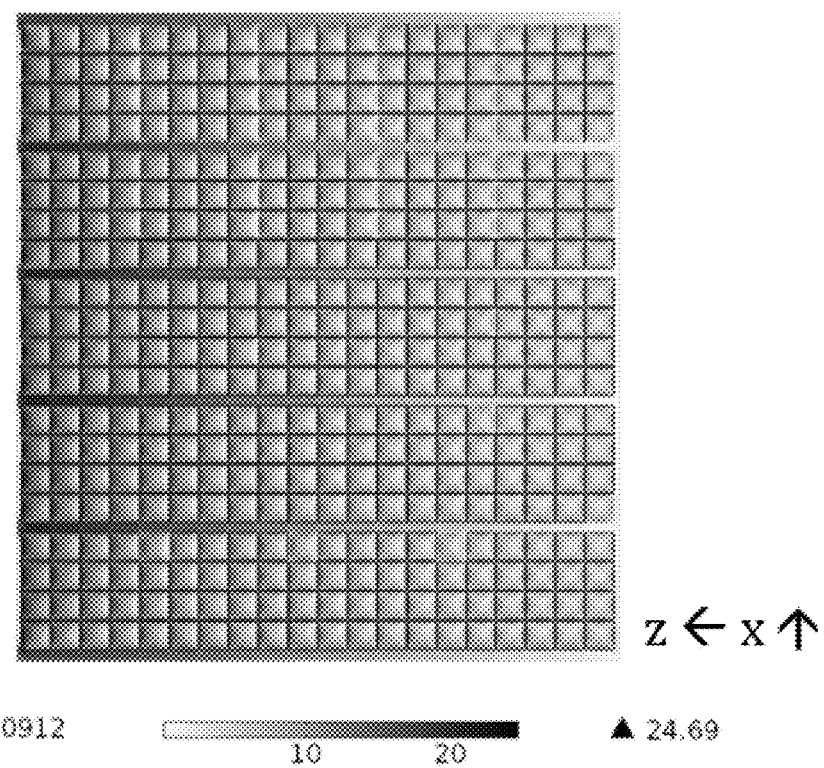
Figure 13B:
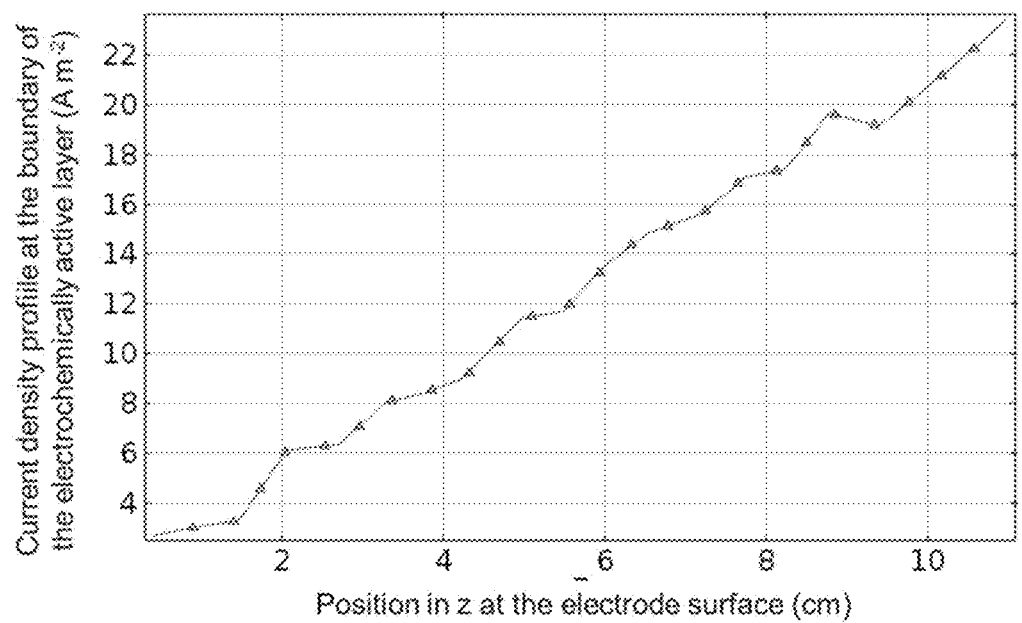

Example 2 was repeated, with a current density distributor having electrically conductive wires both in x and z direction. In both x and z direction two types of electrical conductive wires were used, i.e. wires having a smaller cross section and wires having a larger average cross section (see FIG. 11A). FIG. 11A shows the example in which the thicker wires in x and z direction both have an average cross section of 2 mm, and the smaller wires have an average cross section of 0.25 mm. FIGS. 12A and 13A show the example in which the thicker wires in x direction perpendicular to the major current flow have an average cross section of 2 mm, while the thicker wires in z direction parallel to the major current flow have an average cross section of respectively 1 mm and 0.5 mm, and the smaller wires in x and z direction both have an average cross section of 0.25 mm. The current density profile is shown in FIGS. 11B, 12B, and 13B.

From this model, it may be inferred that replacing of the electrically conductive wires in a direction perpendicular to the main current flow, by wires made of an electrical insulator has a similar effect on the current density distribution and the current density profile along the z-axis, than removing of the electrically conductive wires. The model herewith shows that the thicker wires in x direction perpendicular to the main current flow direction are not indispensable in the current flow over the electrode and that they can be removed if a current density distributor and electrode of reduced weight and material cost is envisaged, while maintaining a comparable electrochemical performance. However, replacing of the electrically conductive wires by wires made of an electrical insulator, will improve the mechanical and dimensional stability when compared to the situation where the electrical insulator threads would simply be removed.

Example 4

Figure 14A:
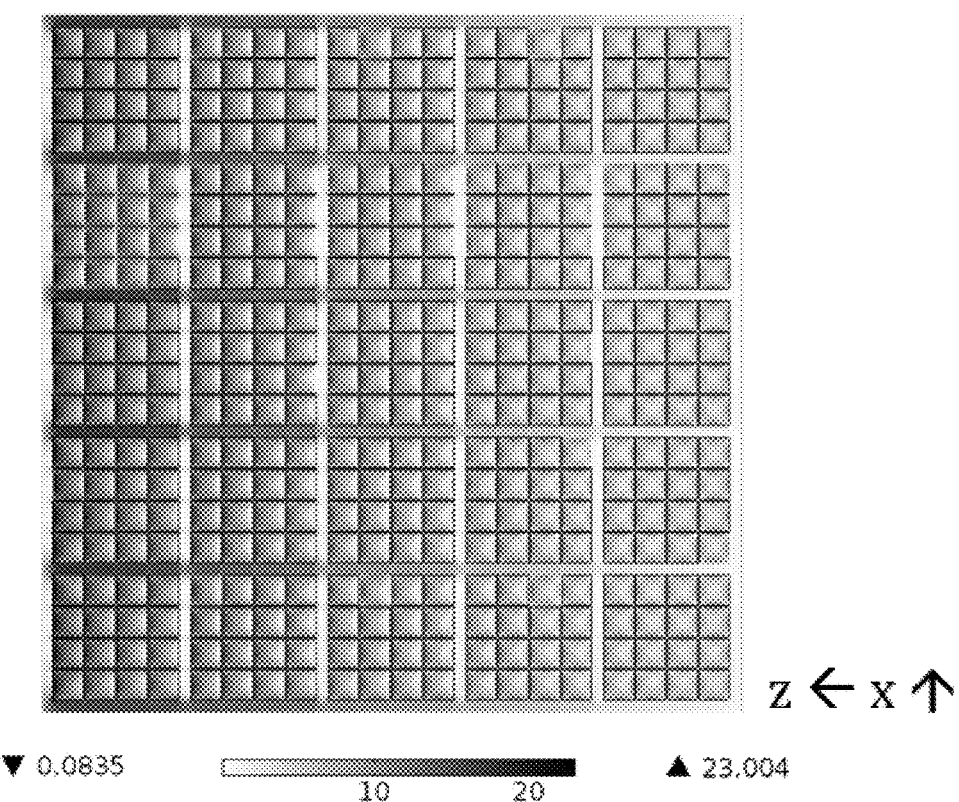
FIGS. 14A, 15A, and 16A show the electric current density distribution for a current density distributor having in a direction perpendicular to the direction of main current flow (x-axis) a plurality of electrically conductive wires with a thickness of respectively 2 mm, and 0.25 mm, and in a direction along to the direction of main current flow (z-axis) a plurality of electrically conductive wires with a thickness of respectively 2 mm, 1 mm and 0.5 mm, the remaining electrically conductive wires having a thickness of 0.25 mm.
Figure 15A:
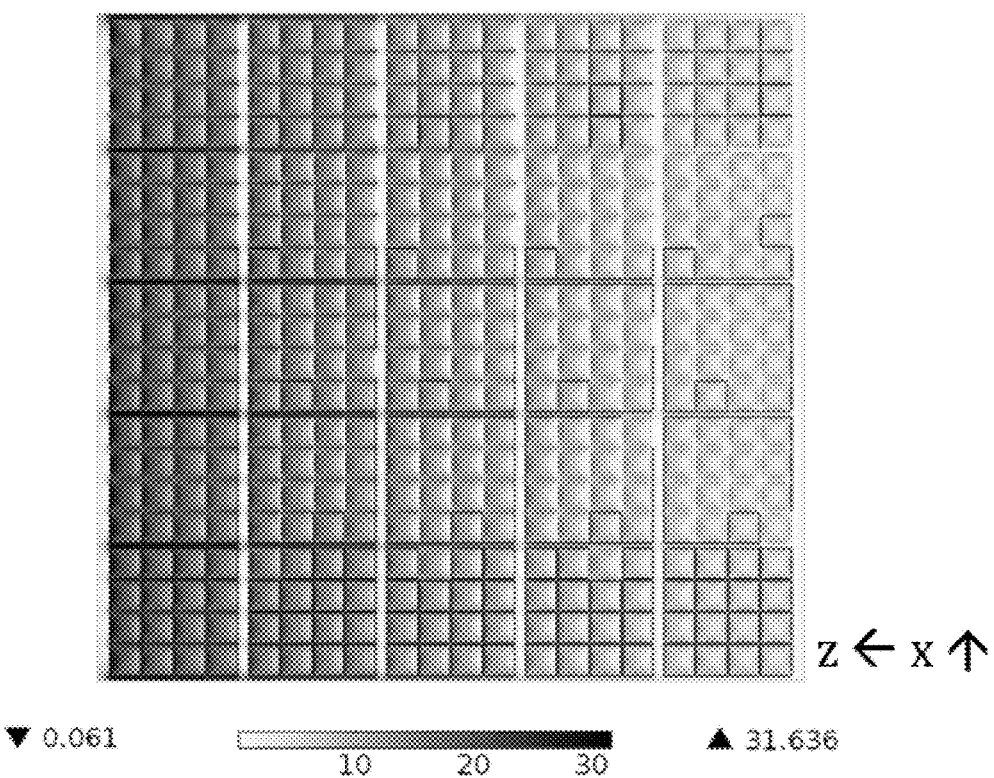
Figure 16A:
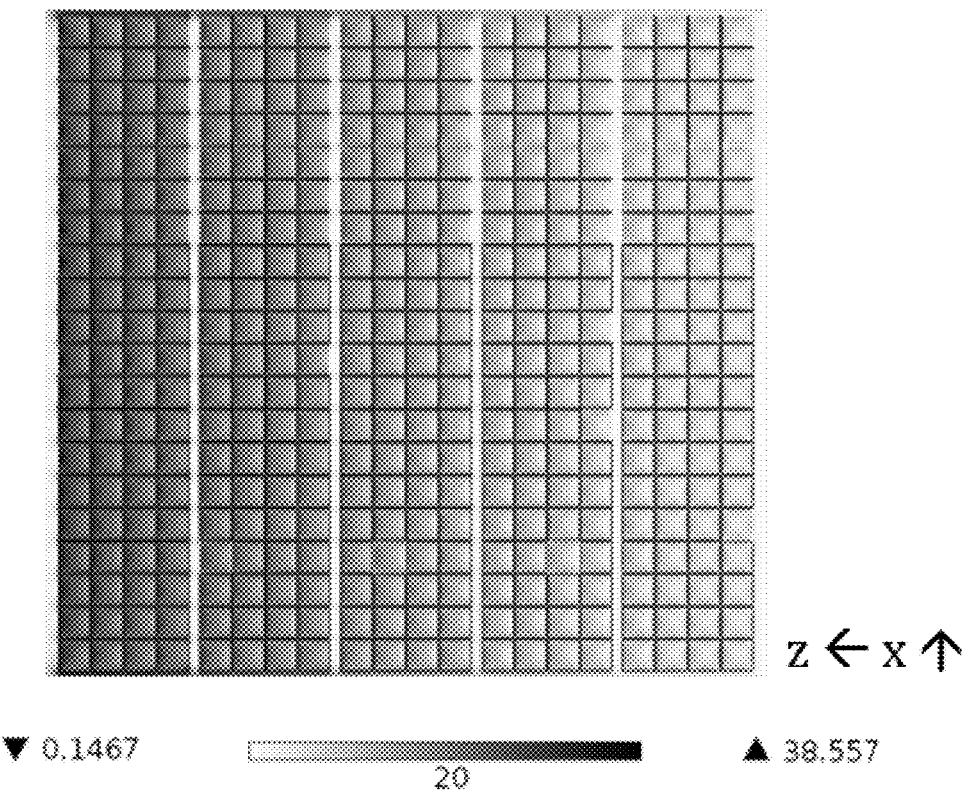

Example 3 was repeated, with the thicker wires in x and z direction both having an average cross section of 2 mm, and the smaller wires have an average cross section of 0.25 mm. The average cross section of the thicker electrically conductive wires in z direction was varied as follows: FIG. 14A 2 mm, FIG. 15A 1 mm, FIG. 16A 0.5 mm.

Figure 14B:
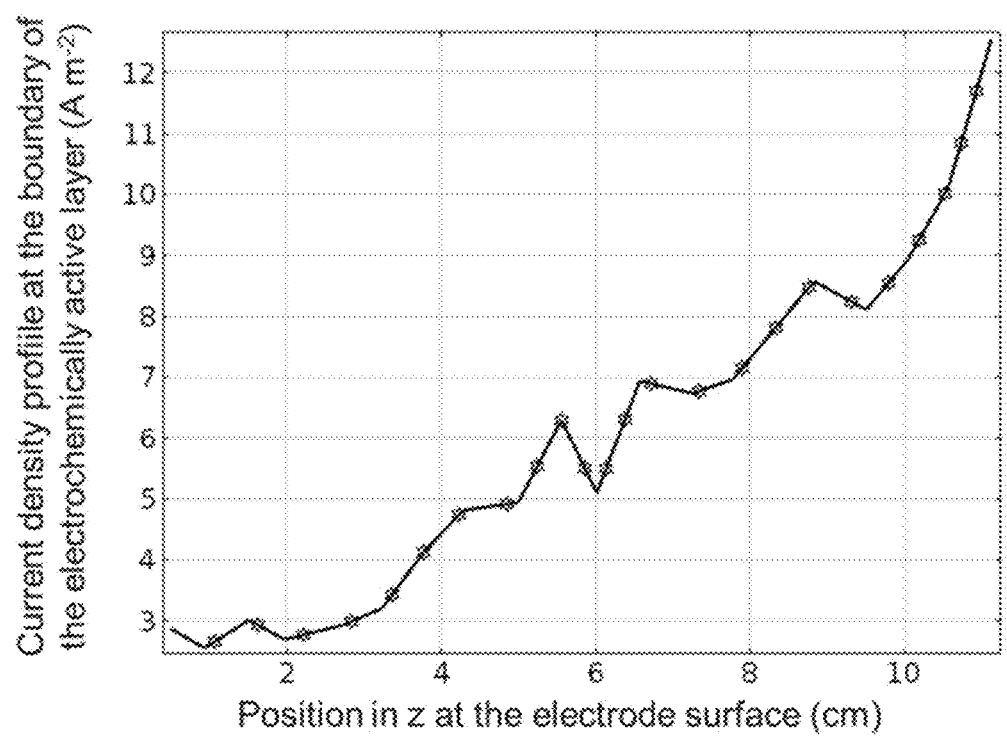
FIGS. 14B, 15B, and 16B show the corresponding current density profile along the z-axis.
Figure 15B:
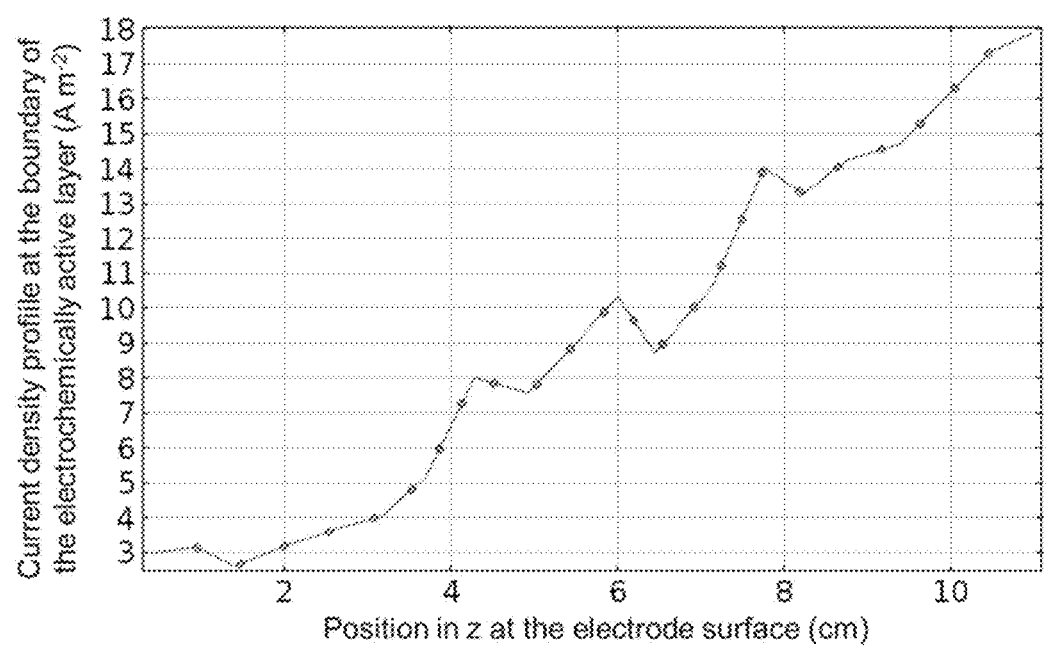
Figure 16B:
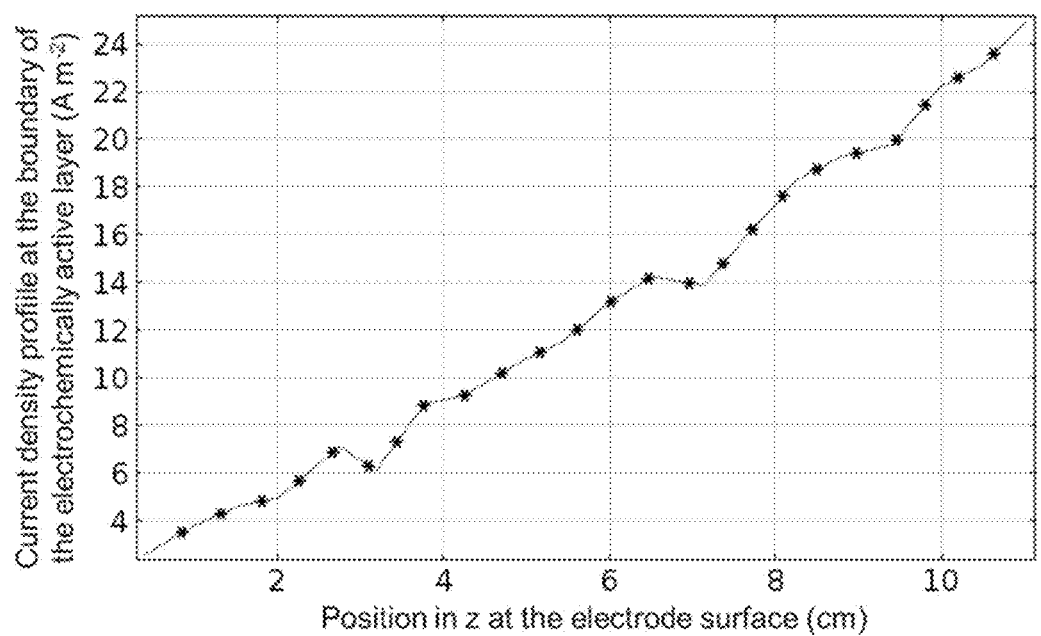

From the electric density profiles shown in FIGS. 14B, 15B, and 16B it can be inferred that increasing the average cross section of the thick wires in z direction along the direction of main current flow, significantly improves the performance of the current density distributor. Therefore, intercalation of plastic wires to replace the thick metal wires in z direction is only advisable in cases where the product selectivity or performance is not appreciated over electrode cost and weight.

As per the model results, as the thick wires in x direction are not indispensable to distribute the current through the electrode, they could be removed providing a current density distributor and therefore an electrode that is lighter in weight and less expensive while maintaining a comparable electrochemical performance, in analogous way to the results encountered in example 2.

The invention claimed is:

1. An electrode comprising:
    at least one mesh-shaped, porous electric current density distributor having an active layer arranged to one face of the current density distributor and a hydrophobic gas diffusion layer arranged to an opposite face thereof,
    wherein the active layer is provided to contact an electrolyte and
    wherein the hydrophobic gas diffusion layer is porous and is provided to contact a gas,
    the current density distributor being mounted into an electrically conductive frame with a lug adapted for providing electric current to the current density distributor and the active layer of the electrode, wherein the electric current flows along a direction of major current flow along the current density distributor,
    wherein the current density distributor comprises a porous mesh having a plurality of electrically conductive paths,
    wherein at least part of the electrically conductive paths extend along the direction of major current flow over the current density distributor,
    wherein the porous mesh comprises in a direction crosswise to the direction of major current flow, at least partly of a plurality of first paths of an electric insulator, and in that a current carrying capacity of the current density distributor in the direction crosswise to the major current flow over the current density distributor is smaller than a current carrying capacity in the direction along the major current flow over the current density distributor, and
    wherein the porous mesh comprises a plurality of open spaces between the electrically conductive paths and/or the first paths of the electric insulator.

2. The electrode according to claim 1, comprising a single current density distributor.

3. The electrode according to claim 1, wherein the active layer comprises a plurality of contact points with the current density distributor.

4. The electrode according to claim 3, wherein the active layer comprises a catalytically active material selected from the group of one or more micro-organisms, one or more enzymes, one or more organo-metallic compounds, one or more inorganic and/or organic compounds.

5. The electrode according to claim 1, wherein the porous mesh comprises a material selected from the group consisting of a woven wire, a knitted wire, a braided wire, a welded wire, an expanded mesh, a plate having a plurality of holes, a screen having a plurality of holes, and a plate having a plurality of holes, which has been photo-chemically etched or electroformed to provide the electrically conductive paths.

6. The electrode according to claim 1, wherein the porous mesh has an open area of at least 50%.

7. The electrode as claimed in claim 1, wherein the number of electrically conductive paths in the direction crosswise to the direction of major current flow per length unit is smaller than the number of electrically conductive paths per length unit along the direction of the major current flow.

8. The electrode as claimed in claim 1, wherein the electrically conductive paths of the porous mesh comprise along the direction parallel to the current flow a plurality of first electrically conductive paths, and a plurality of second electrically conductive paths, wherein the first electrically conductive paths have a cross section which is larger in comparison to a cross section of the second electrically conductive paths.

9. The electrode according to claim 1, wherein electrical conductivity of the electrically conductive paths at 20° C. is preferably at least $1.25 \times 10E3$ S/m.

10. The electrode according to claim 1, wherein the resistivity of the electrically conductive paths is less than $8 \times 10E(-4)$ Ohm·m.

11. The electrode according to claim 1, wherein a material of which the electrically conductive paths are produced offers a tensile strength of at least 120 MPa.

12. The electrode according to claim 1, wherein a material of which the electrically conductive paths are produced is selected from the group consisting of conductive polymers, metal alloys comprising one or more metals selected from the group consisting of gold, iridium, platinum, rhodium, palladium, silver, copper, nickel, zinc, tungsten, titanium, aluminum, tin, steel, stainless steel alloys, austenitic stainless steels, and duplex stainless steel.

13. The electrode according to claim 1, wherein the electrically conductive paths have an average cross section of 50 μm to 500 μm.

14. The electrode according to claim 1, wherein the number of electrically conductive paths in the porous mesh is between 10 and 50 paths per cm.

15. The electrode according to claim 1, wherein the porous mesh comprises along the direction of major current flow over the current density distributor, a plurality of second paths of an electric insulator.

16. The electrode according to claim 1,
wherein along the direction of major current flow the electrically conductive paths and a plurality of second electrically insulating paths are alternatingly provided.

17. The electrode according to claim 1, further comprising a plurality of second paths of electric insulator,
wherein the electrically conductive paths and the first and second paths of electric insulator are arranged according to a regular geometric pattern.

18. The electrode according to claim 1,
wherein the electric conductive paths comprise a plurality of electrically conductive wires, and
wherein the first paths of an electric insulator comprise a plurality of threads of an electric insulator.

19. The electrode according to claim 1, wherein a material for the paths of an electric insulator has an electrical resistance at 20° C. of at least 10E12 Ohm·m.

20. The electrode according to claim 1, wherein a material for the paths of an electric insulator has a tensile strength of at least 15 MPa.

21. The electrode according to claim 1, wherein the electric insulator offers a compression strength of at least 20 MPa.

22. The electrode according to claim 1, wherein the plurality of first paths of electrical insulator have an average cross section of 50 μm to 250 μm.

23. The electrode according to claim 1, wherein the number of paths of electric insulator in the porous mesh is between 10 and 50 paths per cm.

24. The electrode according to claim 1, wherein a material for the electric insulator is selected from the group consisting of polyaramides, polyesters, polyolefins, polyetherketone, polyphenylene sulfide, polyether imide (PEI), aliphatic polyamides, fluoroplastics, and a composite material comprising a polymeric matrix of one or more of the polymers indicated above, or any combination or blend of two or more of the afore-mentioned polymers indicated above and wherein the material for the electric insulator further comprises a reinforcing component comprising glass fiber and/or ceramic fiber.

25. The electrode according to claim 24, wherein a material for the electric insulator is polyethylene terephthalate, UHMWPE, HDPE, polypropylene, PTFE, ETFE, FEP, PFA, EFEP, or PCTFE.

26. An electrochemical cell comprising at least one electrode according to claim 1.

27. The electrochemical cell according to claim 26, wherein the electrochemical cell is a galvanic cell or a capacitive cell.

28. An electrochemical cell comprising a plurality of electrodes according to claim 1, in a unipolar arrangement.

* * * * *

UNITED STATES PATENT AND TRADEMARK OFFICE
CERTIFICATE OF CORRECTION

| | | |
|---|---|---|
| PATENT NO. | : 10,087,537 B2 | Page 1 of 1 |
| APPLICATION NO. | : 14/770431 | |
| DATED | : October 2, 2018 | |
| INVENTOR(S) | : Deepak Pant | |

It is certified that error appears in the above-identified patent and that said Letters Patent is hereby corrected as shown below:

In the Specification

Column 1, Line 3, above "FIELD" insert --Cross Reference to Related Applications
This application is a U.S. National Phase Application of PCT International Application Number PCT/EP2014/053737, filed on February 26, 2014, designating the United States of America and published in the English language, which is an International Application of and claims the benefit of priority to European Patent Application No. 13156781.0, filed on February 26, 2013. The disclosures of the above-referenced applications are hereby expressly incorporated by reference in their entireties.---.

Column 14, Line 14, "(PAM)," should be --(PANI),--.

Column 14, Lines 15-16, "polyfluorene" should be --polyfluorene.--.

Column 17, Line 26, "in on the" should be --on the--.

Column 17, Line 62, "in on the" should be --on the--.

Signed and Sealed this
Twelfth Day of February, 2019

Andrei Iancu
*Director of the United States Patent and Trademark Office*